（12）United States Patent
Takemoto

(10) Patent No.: US 7,894,673 B2
(45) Date of Patent: Feb. 22, 2011

(54) IMAGE PROCESSING APPARATUS AND METHOD, AND IMAGE PROCESSING COMPUTER READABLE MEDIUM FOR PROCESSING BASED ON SUBJECT TYPE

(75) Inventor: Fumito Takemoto, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 998 days.

(21) Appl. No.: 11/664,112

(22) PCT Filed: Sep. 30, 2005

(86) PCT No.: PCT/JP2005/018577

§ 371 (c)(1),
(2), (4) Date: Mar. 30, 2007

(87) PCT Pub. No.: WO2006/036027

PCT Pub. Date: Apr. 6, 2006

(65) Prior Publication Data

US 2007/0292038 A1    Dec. 20, 2007

(30) Foreign Application Priority Data

Sep. 30, 2004   (JP)   ............................. 2004-285681

(51) Int. Cl.
*G06K 9/00* (2006.01)
*G06T 5/00* (2006.01)
(52) U.S. Cl. ..................................... 382/190; 382/274
(58) Field of Classification Search ....................... None
See application file for complete search history.

(56) References Cited

U.S. PATENT DOCUMENTS

| 5,940,530 A | 8/1999 | Fukushima et al. |
| 2004/0151376 A1 | 8/2004 | Nomura et al. |

FOREIGN PATENT DOCUMENTS

JP   8-32838 A   2/1996

(Continued)

OTHER PUBLICATIONS

First Office Action issued by the State Intellectual Property Office of People's Republic of China in counterpart application No. 200580032846.2 on Aug. 8, 2008, 9 pages in English and Chinese.

(Continued)

*Primary Examiner*—Brian P Werner
(74) *Attorney, Agent, or Firm*—Sughrue Mion, PLLC

(57) ABSTRACT

A certainty calculating circuit calculates certainties representing to what degrees of confidence respective ones of images representing a predetermined plurality of types of subject are contained in an image represented by accepted image data, the calculation being performed for every prescribed type of subject based upon a feature value obtained from the accepted image data. A density correction value calculating circuit calculates density correction values with regard to respective ones of the plurality of subject types. Upon being weighted by respective ones of weights that are based upon the calculated certainties of each of the subject types, the plurality of density correction values are unified in a density correction value unifying circuit. The density of the image represented by the accepted image data is corrected in an image correcting circuit using the unified density correction value.

8 Claims, 19 Drawing Sheets

FOREIGN PATENT DOCUMENTS

| | | |
|---|---|---|
| JP | 2000-196890 A | 7/2000 |
| JP | 2001-076149 A | 3/2001 |
| JP | 2002-218480 A | 8/2002 |
| JP | 2004-240622 A | 8/2004 |
| JP | 2004-246673 A | 9/2004 |

OTHER PUBLICATIONS

Notification of Reasons for Refusal, dated Aug. 25, 2009, issued in corresponding JP Application No. 2006-537861, 5 pages English and Japanese.

Fig. 3

| SUBJECT TYPE | IMAGE EXAMPLE | DEFINITION |
|---|---|---|
| HUMAN FACE | | HUMAN FACE IS PRESENT |
| UNDERWATER | | AREA RATIO OF UNDERWATER COLORS IS 50% OR GREATER |
| HIGH SATURATION | | SUBJECT IMAGE AREA RATIO HAVING HIGHLY SATURATED COLORS IS 20% OR GREATER |
| SUNSET SCENE | | SUNSET IS PRESENT |
| NIGHT SCENE | | NIGHT-SCENE AREA RATIO IS 30% OR GREATER AND LIGHT IS PRESENT |
| BLUE SKY | | BLUE-SKY AREA RATIO IS 30% OR GREATER |
| HIGH KEY | | WHITE-COLOR AREA RATIO IS 50% OR GREATER |
| OUTSIDE SCOPE OF DETECTION | | NOT APPLICABLE TO ANY OF ABOVE-CITED DEFINITIONS |

Fig. 5

| SUBJECT TYPE | TYPE OF FEATURE TO BE USED IN CALCULATION OF CERTAINTY | IDENTIFICATION POINTS |
|---|---|---|
| UNDERWATER | B-VALUE AVERAGE | -2.1, -2.2, ....., 2.5, 2.2 |
| | B VALUE (80% POINT) - B VALUE (20% POINT) | 2.5, 2.3, ....., -2.0, -2.3 |
| | Cb VALUE 70% POINT | -1.8, -1.9, ....., -2.0, -2.3 |
| ...... | ...... | ...... |
| SUNSET SCENE | R-VALUE 70% VALUE | -2.5, -3.2, ....., 3.1, 3.0 |
| | Y-VALUE 90% VALUE | -2.0, -2.5, ....., 2.8, 3.0 |
| | R-VALUE 90% VALUE | -1.8, -1.8, ....., 2.0, 1.9 |
| | Cr-VALUE AVERAGE | -1.5, -1.3, ....., 1.5, 1.6 |
| ...... | ...... | ...... |
| BLUE SKY | B-VALUE 90% VALUE | -1.8, -1.6, ....., 3.2, 3.0 |
| | Y-VALUE 70% VALUE | -2.1, -1.9, ....., 2.3, 2.1 |
| | B-VALUE 70% VALUE | -1.5, -1.3, ....., 1.6, 1.4 |
| ...... | ...... | ...... |

|  | HUMAN FACE fa | BLUE SKY bs | OUTSIDE SCOPE OF DETECTION ot |
|---|---|---|---|
| SUBJECT CERTAINTY P | 0.6 | 0.1 | 0.4 |
| WEIGHT V BASED UPON CERTAINTY | 0.55 | 0.09 | 0.36 |
| DEGREE S OF IMPORTANCE | 0.6 | 0.1 | 0.3 |

Fig. 18
| LIGHTING TYPE | IMAGE EXAMPLE | DEFINITION |
|---|---|---|
| BACKLIGHT |  | CONTAINS PERSON; PERSON APPEARS DARK, SURROUNDINGS APPEAR BRIGHT |
| PROXIMITY STROBE |  | CONTAINS PERSONS; PERSON APPEARS BRIGHT, SURROUNDINGS APPEAR DARK |
| TUNGSTEN |  | OVERALL IMAGE HAS ORANGE CAST; PHOTOGRAPHY UNDER TUNGSTEN LIGHT SOURCE CAN BE RECOGNIZED |

IMAGE PROCESSING APPARATUS AND METHOD, AND IMAGE PROCESSING COMPUTER READABLE MEDIUM FOR PROCESSING BASED ON SUBJECT TYPE

TECHNICAL FIELD

This invention relates to an image processing apparatus and method and to an image processing program.

BACKGROUND ART

A digital still camera having an image data processor 24 that includes a scene determination unit 31 is described in Japanese Patent Application Laid-Open No. 2002-218480. On the basis of a color histogram and whether an image contains an image representing a person, the scene determination unit 31 determines whether the image is in a photographic scene that is a snapshot, a portrait, a commemorative shot, scenery, a sunset, a night scene, a night-scene portrait, the sea, a scene shot under a fluorescent light source or scene shot under a tungsten light source. When the scene in which the image has been shot is determined, the image is subjected to correction processing, which has been set for every photographic scene, based upon the photographic scene determined.

However, actual images also include those for which it is not possible to clearly distinguish to which preset photographic scene they belong. For example, in Japanese Patent Application Laid-Open No. 2002-218480, an image that includes the image of a person (a snapshot) against a background of a sunset scene is determined as being either a "sunset scene" or a "snapshot". In a case where an image has the characteristics of two scenes, there is the danger that the final result of a correction will be adversely affected when the image is judged to be either scene or the other.

DISCLOSURE OF THE INVENTION

An object of the present invention is to so arrange it that an image correction can be applied appropriately even to an image containing a plurality subject types (photographic scenes).

Another object of the present invention is to so arrange it that an image correction can be applied in accordance with the extent (likelihood, certainty, confidence, degree) to which a type of subject believed to be contained in an image to be processed exists in the image.

A further object of the present invention is to so arrange it that an image correction can be applied in accordance with the likelihood (certainty, confidence, degree) of a type of lighting, which is used at the time of photography, detected based upon an image to be processed.

An image processing apparatus according to the present invention is characterized by comprising: subject type-by-type certainty calculating means for calculating certainties representing to what degrees of confidence respective ones of images representing a predetermined plurality of subject types are contained in an image represented by applied image data, the calculation being performed for every prescribed subject type based upon a feature value obtained from the image data; subject type-by-type correction value calculating means for calculating correction values regarding respective ones of the plurality of subject types based upon the image data; correction-value unifying means for calculating a unified correction value obtained by weighting each of the correction values, which have been calculated by the subject type-by-type correction value calculating means, with regard to corresponding subject types by weights conforming to the subject type-by-type certainties calculated with regard to respective ones of the plurality of subject types by the subject type-by-type certainty calculating means, and unifying the subject type-by-type values obtained by weighting; and image data correction means for correcting the image data using the unified correction value calculated by the correction-value unifying means.

An image processing method according to the present invention is characterized by comprising: calculating certainties representing to what degrees of confidence respective ones of images representing a predetermined plurality of subject types are contained in an image represented by applied image data, the calculation being performed for every prescribed subject type based upon a feature value obtained from the accepted image data; calculating correction values regarding respective ones of the plurality of subject types based upon the image data; calculating a unified correction value obtained by weighting each of the correction values, which have been calculated with regard to corresponding subject types by weights conforming to the subject type-by-type certainties calculated with regard to respective ones of the plurality of subject types, and unifying the subject type-by-type values obtained by weighting; and correcting the image data using the unified correction value calculated.

The present invention also provides a program for causing a computer to execute the above-described image processing method (a program for causing a computer to function as the above-described image processing apparatus). The program according to the present invention causes a computer to execute: subject type-by-type certainty calculation processing for calculating certainties representing to what degrees of confidence respective ones of images representing a predetermined plurality of subject types are contained in an image represented by applied image data, the calculation being performed for every prescribed subject type based upon a feature value obtained from the accepted image data; subject type-by-type correction value calculation processing for calculating correction values regarding respective ones of the plurality of subject types based upon the image data; correction-value unification processing for calculating a unified correction value obtained by weighting each of the correction values, which have been calculated by the subject type-by-type correction value calculation processing, with regard to corresponding subject types by weights conforming to the subject type-by-type certainties calculated with regard to respective ones of the plurality of subject types by the subject type-by-type certainty calculation processing, and unifying the subject type-by-type values obtained by weighting; and image data correction processing for correcting the image data using the unified correction value calculated by the correction-value unification processing.

A plurality of types of subject for which certainties are to be calculated are determined in advance. Set as the subject types are a plurality of types of subject (which may also be referred to as types of photographic scene) identifiable based upon image data, these types of subject being set in order to undergo different corrections in image correction (it is known from experience that executing different correction processing results in a corrected image that is appropriate). For example, "human face", "underwater", "high saturation", "sunset scene", "night scene", "blue sky", "high key" and "outside scope of detection" can be set as the plurality of subject types.

Calculated for each of predetermined subject types are certainties (levels or grades) representing to what degrees (of likelihood) respective ones of images representing a predetermined plurality of subject types are contained in an image represented by applied image data. In calculating certainties, use is made of the extent to which each of the subject types contains a specific feature.

For example, an image of "underwater" subject type (this will be referred to as an "underwater image" below) naturally contains, over a wide range within the image, pixels having so-called underwater colors (colors that belong to the blue-to-green color range). In the simplest case, if pixels having underwater colors are contained to an extent that exceeds a prescribed area, then this image can be identified as being an underwater image and the certainty can be calculated in accordance with this area. It goes without saying that the certainty that an image is an underwater image can be calculated utilizing features of a plurality of types.

In one embodiment, the image processing apparatus is provided with a memory (a memory for certainty calculation) storing, for every type of subject, one or a plurality of types of feature suited to calculation of certainty and point data for calculating certainty in accordance with a feature (features). A feature value is calculated based upon the image data upon referring to the memory for certainty calculation, and certainty can be calculated in accordance with the point data obtained in conformity with the feature value calculated. The point data may be adopted as the certainty as is. If a plurality of features are used in calculating certainty, then a value obtained by summing each of the items of point data may be adopted as the certainty. A value that is the result of dividing the summed point data by the number of features may be adopted as the certainty. Certainty may be decided in accordance with a prescribed function based upon a value that is the result of dividing the summed point data by the number of features. Certainty preferably is normalized to values ranging from 0 to 1.

In a plurality of subject types, it may be arranged to obtain certainties regarding respective ones of a plurality of subject types for which certainty is capable of being calculated (subject types to undergo detection), and, utilizing a plurality of the certainties obtained, to obtain the certainty of a subject type that is outside the scope of detection. For example, certainties regarding respective ones of a plurality of subject types for which certainties are capable of being calculated are each normalized to a range of 0 to 1, and the result of multiplying together values obtained by subtracting the calculated certainties normalized with regard to respective ones of the subject types from 1 can be adopted as the certainty of a subject type that is outside the scope of detection.

Correction values regarding respective ones of the plurality of subject types are calculated based upon the accepted image data. The correction values are calculated in correspondence with respective ones of the subject types for which certainty is calculated in the subject type-by-type certainty calculation processing.

The correction values calculated include various correction values, a density (luminance) grayscale correction value, a CMY density grayscale correction value, a saturation correction value and other correction values that can be used in image correction. For example, in a case where a density correction value (density grayscale correction value) is calculated as the correction value, various known methods of calculation can be employed in calculating the density correction value. For example, a target density correction value can be set beforehand, correction coefficients can be calculated such that the average density of each of the pixels (or specific portion) represented by the accepted input image data will become the target density correction value, and the density correction value can be calculated based upon the correction coefficients. A density correction quantity may be calculated based upon a regression formula that relies upon multiple regression analysis, as described in the specification of Japanese Patent Application Laid-Open No. 2001-257883. The density correction values may be in the form of a function or in the form of a table (look-up table). In any case, the correction value stipulates the relationship between an input value and an output value. If the correction value is a density correction value, then the value stipulates the relationship between an input density value and an output density value.

It may be so arranged that with regard to a subject type for which the certainty calculated by the subject type-by-type certainty calculating means is less than a prescribed value, the correction value regarding this subject type is not calculated. By not executing processing for calculating a correction value regarding a subject type not contained in the input image (or for which the possibility of inclusion is small), the time needed for the correction value calculation processing can be curtailed.

A plurality of correction values calculated by the subject type-by-type correction value calculating means are unified based upon the calculated plurality of subject type-by-type certainties.

In one embodiment, a correction value after unification is the result of calculating weights conforming to magnitudes of certainties for every subject type based upon the calculated plurality of subject type-by-type certainties, and unifying values obtained by multiplying each of the correction values by the weights calculated. In unification processing, computation that differs depending upon the type of correction value can be performed. For example, if a correction value is a density correction value, the unification processing will be addition processing. If the correction value is a luminance correction value, then the unification processing will be multiplication processing. Thus, unification processing can be decided in dependence upon the type of correction value.

In another embodiment, a correction value after unification is the result of calculating weights conforming to magnitudes of certainties based upon the calculated plurality of subject type-by-type certainties, and unifying values obtained by multiplying together the calculated weights of each of the subject types, degrees of importance regarding respective ones of a plurality of subject types applied or set in advance, and the correction values (correction values of respective ones of corresponding subject types).

The larger the certainty of every subject type (the larger the weight conforming to certainty), the more strongly the unified correction value obtained reflects the correction value regarding the particular subject type. In a case where further use is made of degree of importance, the unified correction value strongly reflects the correction value regarding a subject type whose degree of importance is great.

The accepted image data is corrected using the unified correction value obtained by correction-value unification processing.

In accordance with the present invention, subject types contained in an image represented by accepted image data are discriminated automatically and a unified correction value weighted in accordance with degrees of certainty representing to what extent these subject types are contained in the image is obtained. The image data is corrected based upon the unified correction value thus obtained. Even if the image is one containing two or more subject types, well-balanced correction processing can be executed. Since a correction value regarding a subject type having a large weight that is based upon the degree of certainty is strongly reflected in the unified correction value, an image correction that conforms to the content of the image represented by the applied image data is implemented. Naturally, in a case where further use is made of degree of importance of every subject type externally applied or set in advance, the unified correction value can be changed in accordance with the degree of importance. Image correction based upon user preference can be carried out.

In one embodiment, the image processing apparatus further includes subject-type designating means, the subject type-by-type certainty calculating means calculating the subject type-by-type certainty with regard to a subject type designated by the subject-type designating means or a subject type other than a subject type designated by the subject-type designating means. Further, the subject type-by-type correction value calculating means calculates the subject type-by-type correction value with regard to a subject type designated by the subject-type designating means or a subject type other than a subject type designated by the subject-type designating means. In a case where it is known beforehand that a specific subject type, for example, does not exist in an image represented by image data applied to the image processing apparatus, it is unnecessary to calculate degree of certainty and a correction value regarding the specific subject type. A specific type of subject type known beforehand to exist in the image (or specific subject type known beforehand not to exist in the image) is designated by the subject-type designating means. Degree of certainty and a correction value are calculated solely with regard to a designated subject type, or degree of certainty and a correction value are calculated solely with regard to a subject type other than a designated subject type. This makes it possible to shorten the processing time involved in the processing for calculating certainty and processing for calculating a correction value. Further, so arranging it that a degree of certainty and correction value regarding a specific subject type are forcibly not calculated prevents a situation in which degree of certainty and a correction value regarding the specific subject type are calculated in spite of the fact that the specific subject type does not exist in an image. This enhances correction accuracy.

The image processing apparatus preferably further comprises a lighting type-by-type certainty calculating means for calculating lighting certainties representing to what degrees of confidence the image represented by the image data was shot under respective ones of a predetermined plurality of lighting types, the calculation being performed for every prescribed lighting type based upon a feature value obtained from the image data; lighting type-by-type correction quantity calculating means for calculating correction quantities regarding respective ones of the prescribed plurality of lighting types based upon the image data; and correction quantity calculating means for weighting each of the correction quantities, which have been calculated by the lighting type-by-type correction quantity calculating means, with regard to corresponding lighting types by weights conforming to the lighting type-by-type lighting certainties calculated by the lighting type-by-type certainty calculating means, and calculating a correction quantity by summing the lighting type-by-type values obtained by weighting; wherein the predetermined plurality of subject types include a plurality of subject types that are detectable (the certainties whereof are capable of being calculated) and a subject type that is outside the scope of detection; the correction-value unifying means using a value, which is obtained by adding the correction quantity calculated by the correction quantity calculating means to an input value to be corrected, as a correction value of a subject type that is outside the scope of detection. A value obtained by adding the correction quantity calculated by the correction quantity calculating means to an input value (density value, luminance value, etc.) obtained from image data becomes the correction value (density correction value, luminance correction value, etc.) of a subject type that is not a target of detection.

Types of lighting used when shooting include those that produce a special color offset and a special color pattern. For example, an image captured under backlight, an image captured by a proximity strobe and an image captured under a tungsten light source each have a specific color offset and a specific color pattern. Degree of certainty (lighting type-by-type certainty) can be calculated in accordance with a color offset and color pattern that appear in an image in dependence upon the lighting type.

In the calculation of lighting type-by-type certainty as well, it may be arranged to obtain certainties regarding respective ones of lighting types for which certainty is capable of being calculated, and, utilizing the obtained certainties regarding respective ones of the lighting types, to obtain the certainty regarding a lighting type that is outside the scope of detection (the certainty of another lighting type).

For example, if a person is photographed under backlighting, the person in the image obtained will appear dark and the surroundings will appear bright. With regard to an image of this kind, there is a possibility that the image processing apparatus will lower the degree of certainty of the subject type "human face" and raise the degree of certainty of the subject type "outside the scope of detection". Upon taking note of these facts, the image processing apparatus calculates the degree of certainty regarding the lighting type and uses a correction quantity, which is calculated in accordance with a weight that is based upon the degree of certainty of the lighting type, in calculating a correction value regarding the subject type "outside the scope of detection", thereby making it possible to improve the accuracy of image correction with regard to an image that contains a subject type that is outside the scope of detection.

BRIEF DESCRIPTION OF THE DRAWINGS

FIG. 3 illustrates the content of subject types detected by the image processing apparatus, examples of images and definitions;

FIG. 5 illustrates the content of a certainty calculation memory;

FIG. 11 illustrates examples of certainty, weight based upon certainty and degree of importance regarding each of three subject types (human face, blue sky and outside scope of detection);

FIG. 18 illustrates the content of lighting types detected by the image processing apparatus of the second embodiment, examples of images and definitions.

BEST MODE FOR CARRYING OUT THE INVENTION

First Embodiment

Figure 1:
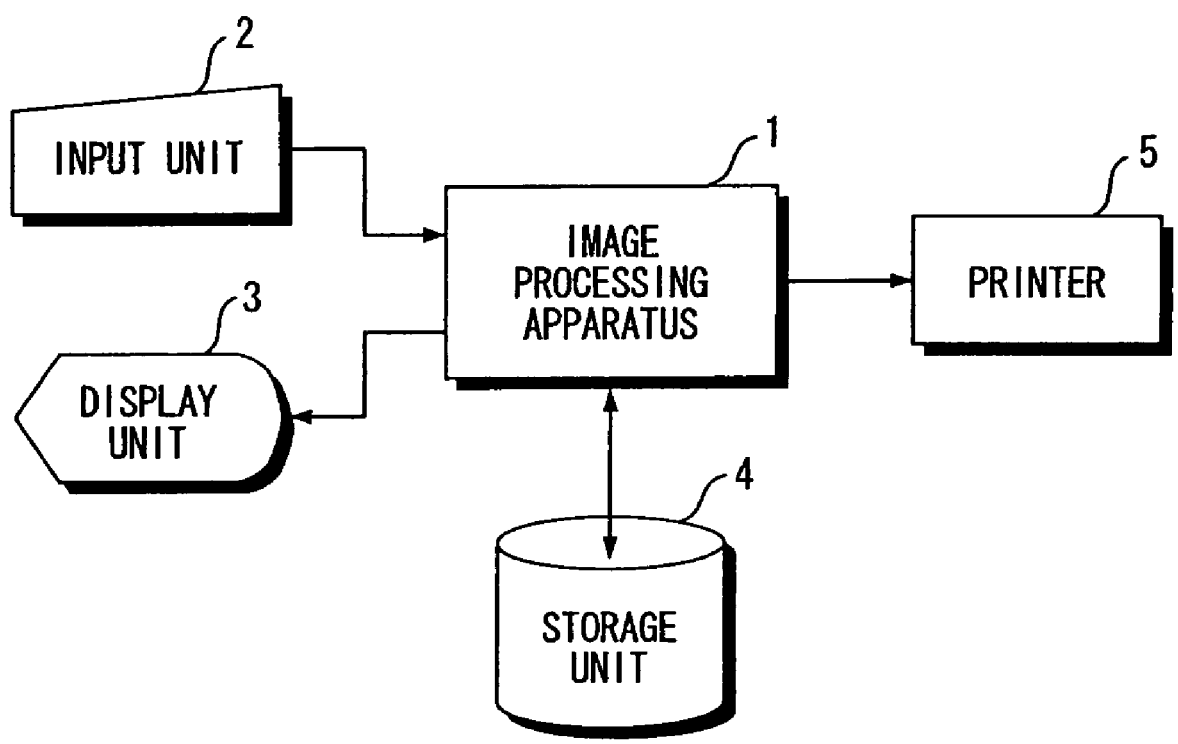
FIG. 1 is a block diagram illustrating the overall configuration of an image processing system.
Figure 2:
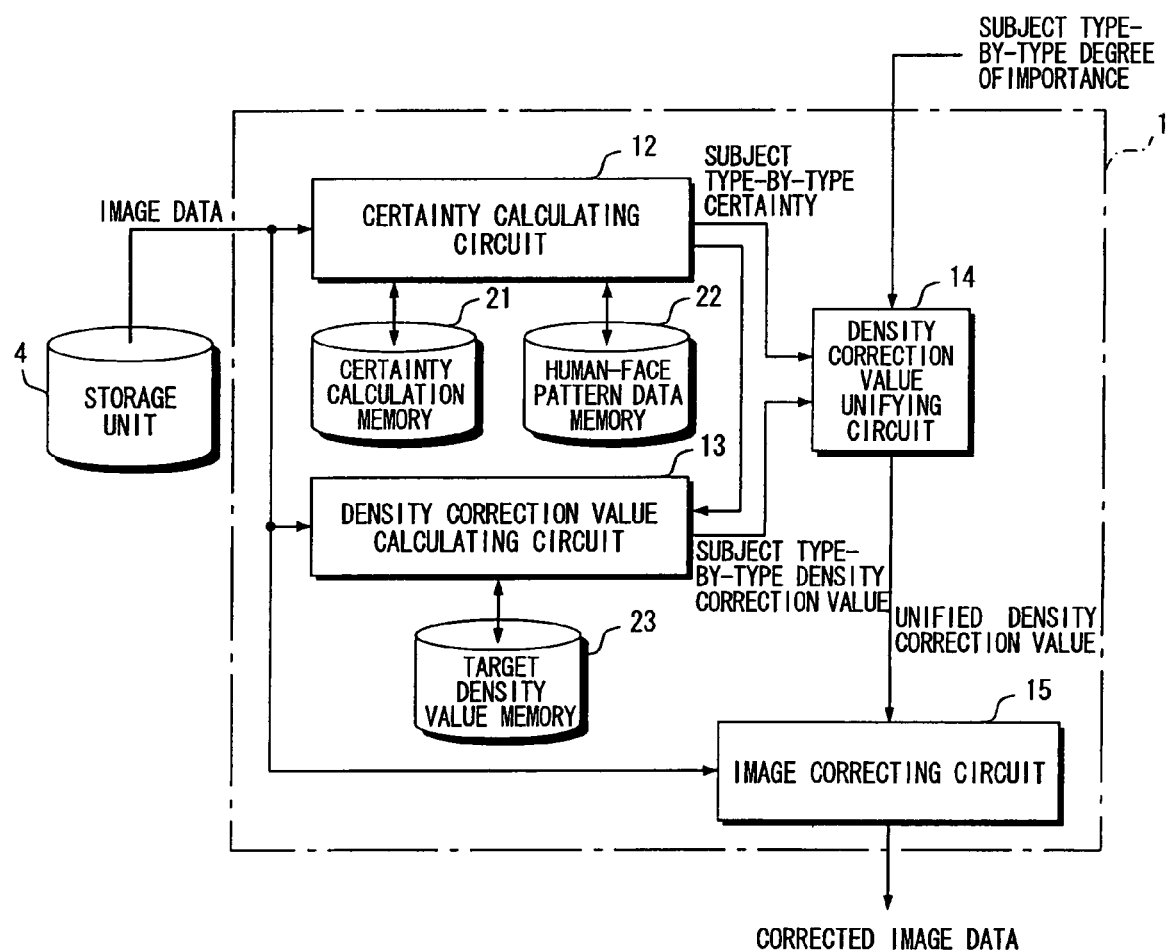
FIG. 2 is a block diagram illustrating the electrical structure of an image processing apparatus according to a first embodiment.

FIG. 1 is a block diagram illustrating the hardware configuration of an image processing system. FIG. 2 is a block diagram illustrating the electrical structure of an image processing apparatus 1, which constitutes the image processing system, together with a storage unit 4.

The image processing system comprises the image processing apparatus 1, an input unit 2 (keyboard, mouse, etc.) connected to the image processing apparatus 1, a display unit 3 (CRT display, liquid crystal display, etc.), the storage unit 4 (hard disk, etc.) and a printer 5.

Image data has been stored in the storage unit 4 connected to the image processing apparatus 1. Image data that has been read out of the storage unit 4 is input to the image processing apparatus 1 via an input interface (not shown). (Image data that is input to the image processing apparatus 1 shall be referred to as "input image data" below, and an image represented by input image data shall be referred to as an "input image" below.) It may of course be so arranged that image data that has been recorded on a CD-ROM, DVD-ROM, memory card or other recording medium instead of the storage unit 4 is input to the image processing apparatus 1. In this case, a CD-ROM drive or DVD-ROM drive, etc., is connected to the image processing apparatus 1 of the image processing system. Naturally, it may be so arranged that image data that has been transmitted through a network is input to the image processing apparatus 1. In this case, a transceiver (modem, etc.) for sending and receiving image data over a network is connected to the image processing apparatus 1.

Input image data that has been read out of the storage unit 4 is applied to a certainty calculating circuit 12, density correction value calculating circuit 13 and image correcting circuit 15 included in the image processing apparatus 1.

The certainty calculating circuit 12 calculates, for every type of subject, certainties representing to what degrees (likelihoods) respective ones of a predetermined plurality of subject types are contained in an input image represented by applied input image data. A memory 21 for calculating certainty and a human-face pattern data memory 22 are connected to the certainty calculating circuit 12. By using the data that has been stored in the memories 21, 22, the certainty calculating circuit 12 calculates the degree of certainty of each subject type contained in the input image represented by the input image data. The certainty calculation processing, the memory 21 for calculating certainty and the human-face pattern data memory 22 in the certainty calculating circuit 12 will be described in detail later.

On the basis of the input image data, the density correction value calculating circuit 13 calculates values (density correction values) for applying a density correction to the input image. Connected to the density correction value calculating circuit 13 is a memory 23 in which have been stored target density values regarding respective ones of the predetermined plurality of subject types. The density correction value calculating circuit 13 calculates a density correction value for every subject type based upon the target density values stored in the memory 23 with regard to the plurality of subject types. The details of processing executed by the density correction value calculating circuit 13 will be described later.

On the basis of the subject type-by-type certainties calculated in the certainty calculating circuit 12 and the subject type-by-type degrees of importance that are externally input using the input unit 2, the density correction value unifying circuit 14 unifies the subject type-by-type density correction values calculated by the density correction value calculating circuit 13. The density correction value unifying circuit 14 calculates a unified density correction value that strongly reflects a density correction value regarding a subject type for which the degree of certainty is large and strongly reflects a density correction value regarding a subject type for which the degree of importance is great. The details of processing executed by the density correction value unifying circuit 14 will be described later.

The image correcting circuit 15 corrects the density of the input image data based upon the unified density correction value that is output from the density correction value unifying circuit 14. The image data that has undergone the density correction by the image correcting circuit 15 is output from the image processing apparatus 1 via an output interface (not shown) and is applied to the display unit 3 or printer 5. The image represented by the image data that has undergone the density correction is displayed on the display screen of the display unit 3 or is output from the printer 5.

Figure 4:
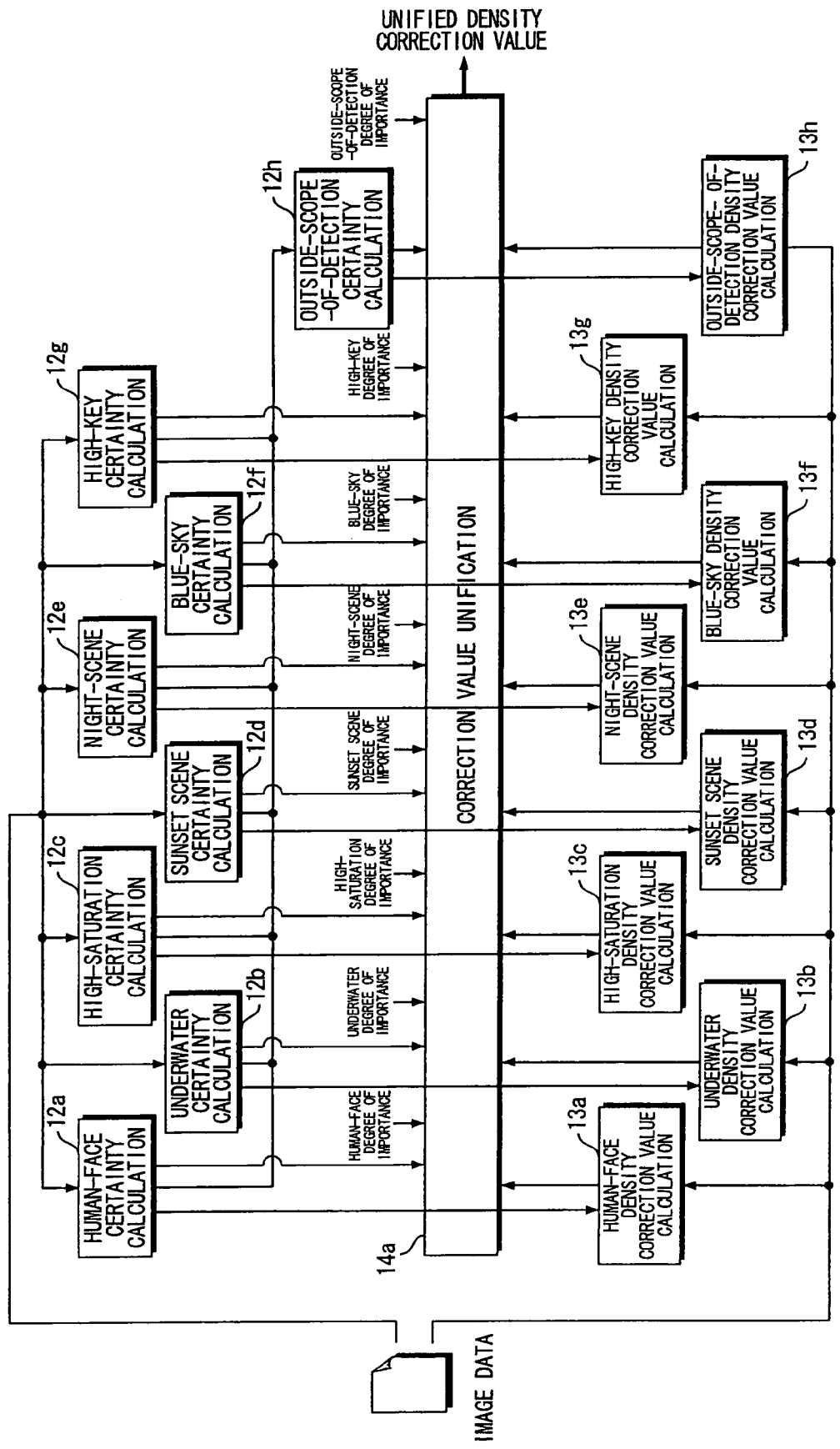
FIG. 4 is a functional block diagram illustrating the functions of a certainty calculating circuit, a density correction value calculating circuit and a density correction value unifying circuit.

FIG. 3 illustrates subject types identified (detected) by, and whose degrees of certainty have been calculated by, the certainty calculating circuit 12, examples of images corresponding to these subject types, and definitions of the subject types. FIG. 4 is a functional block diagram illustrating the functions of the certainty calculating circuit 12, density correction value calculating circuit 13 and density correction value unifying circuit 14.

In this embodiment, the certainty calculating circuit 12 determines whether images representing any of seven subject types "human face", "underwater", "high saturation", "sunset scene", "night scene", "blue sky" or "high key" are contained in the input image and, if any are contained in the input image, calculates the degree of confidence (certainty) to which they are contained (function blocks 12a to 12g). Further, the certainty calculating circuit 12 determines that none of these seven subject types are contained in the input image and calculates the degree of certainty thereof (the degree of certainty regarding the subject type "outside scope of detection")

using the degrees of certainty calculated with regard to respective ones of the seven subject types "human face", "underwater", "high saturation", "sunset scene", "night scene", "blue sky" or "high key" (function block 12h). That is, the certainty calculating circuit 12 identifies (detects) whether the input image contains images representing any subject types among the eight subject types "human face", "underwater", "high saturation", "sunset scene", "night scene", "blue sky", "high key" and "outside scope of detection" and, if such images are contained, calculates the degree (certainty) to which they are contained as a percentage. The details of processing for calculating certainty will be described later.

On the basis of the input image data, the density correction value calculating circuit 13 calculates density correction values regarding respective ones of the subject types for which the certainties have been calculated in the certainty calculating circuit 12. Specifically, in this embodiment, the density correction value calculating circuit 13 is adapted to calculate density correction values regarding respective ones of the eight subject types "human face", "underwater", "high saturation", "sunset scene", "night scene", "blue sky", "high key" and "outside scope of detection" (function blocks 13a to 13h).

The density correction value unifying circuit 14 unifies the subject type-by-type density correction values calculated in the density correction value calculating circuit 13 (function blocks 13a to 13h) in accordance with the subject type-by-type certainties calculated by the certainty calculating circuit 12 (function blocks 12a to 12h) and subject type-by-type degrees of importance that are input from the input unit 2, and calculates one density correction value (unified density correction value) (function block 14a).

The unified density correction value can be expressed by a functional equation representing an output density value corresponding to an input density value. A unified density correction value T(s) (where represents an input density value and is a variable) is represented by Equation 1 below.

$$T(s)=\Sigma[SiViTi(s)] \quad \text{Equation 1}$$

In Equation 1, variable i indicates subject types "human face", "underwater", "high saturation", "sunset scene", "night scene", "blue sky", "high key" and "outside scope of detection". Here Si represents the subject type-by-type degree of importance that is input by the operator of the image processing system using the input unit 2, as mentioned above; Ti(s) represents the subject type-by-type density correction value obtained by the density correction value calculating circuit 13; and Vi represents subject type-by-type weight obtained based upon the subject type-by-type certainties calculated by the certainty calculating circuit 12 as described above. The weight Vi is calculated according to Equation 2 below.

$$Vi=Pi/\Sigma(Pi) \quad \text{Equation 2}$$

In Equation 2 as well, variable i indicates subject types "human face", "underwater", "high saturation", "sunset scene", "night scene", "blue sky", "high key" and "outside scope of detection". Further, Pi represents subject type-by-type certainty calculated by the certainty calculating circuit 12.

As indicated by Equations 1 and 2, the unified density correction value T(s) is obtained by summing the results of multiplying the weight Vi conforming to the magnitude of certainty regarding each of the subject types and the degree S of importance regarding each of the subject types given by the operator by the density correction value Ti(s) of the subject type. As a result, the unified density correction value T(s) strongly reflects the density correction value regarding a subject type for which the degree of certainty is great and strongly reflects the density correction value regarding a subject type for which the applied (set) degree of importance is great.

The details of processing executed by the certainty calculating circuit 12 will now be described.

Among the subject types "human face", "underwater", "high saturation", "sunset scene", "night scene", "blue sky", "high key" and "outside scope of detection" for which certainties are calculated in this embodiment, the methods of calculating certainty with regard to "human face" and "outside scope of detection" differs from the method of calculating certainty with regard to the other subject types "underwater", "high saturation", "sunset scene", "night scene", "blue sky" and "high key". The description regarding certainty calculation processing for the subject types "human face" and "outside scope of detection" will be rendered later; certainty calculation processing regarding the subject types "underwater", "high saturation", "sunset scene", "night scene", "blue sky" and "high key" will be described first.

FIG. 5 illustrates the content of the certainty calculation memory 21 used in calculating certainties regarding respective ones of subject types (with the exception of the certainties of the subject types "human face" and "outside scope of detection") by the certainty calculating circuit 12.

Types of features to be used in certainty calculation and feature-type identification points (sets of a plurality of identification points) (referred to as "identification-point groups" below) have been stored in the certainty calculation memory 21 in correspondence with respective ones of feature types (the six types "underwater", "high saturation", "sunset scene", "night scene", "blue sky" and "high key" in this embodiment) exclusive of "human face" and "outside scope of detection" for which certainties are calculated by the certainty calculating circuit 12.

Generally, a plurality of feature types correspond to one subject type as types of features to be used in calculating certainties. For example, with reference to FIG. 5, "B-VALUE AVERAGE", "B VALUE (80% POINT)-B VALUE (20% POINT)" and "Cb VALUE 70% POINT" have been stored in the certainty calculation memory 21 as types of features to be used in calculating the certainty of the subject type "underwater". This represents the fact that three features, namely (1) a value obtained by averaging the B values of each of the pixels constituting the input image (the B-value average), (2) a value obtained by subtracting the B value corresponding to the 20% point of a cumulative histogram of B values of each of the pixels constituting the input image from the B value corresponding to the 80% point of the histogram [B value (80% point)–B value (20% point)], and (3) a Cb value corresponding to the 70% point of a cumulative histogram of color difference Cb values of each of the pixels constituting the input image (Cb value 70% point), are adopted as the types of features to be used in calculating certainty with regard to the subject type "underwater".

The identification-point groups are sets of identification points for calculating certainties. Details regarding the identification-point groups will become clear in processing for creating the certainty calculation memory 21, described next.

Figure 6:
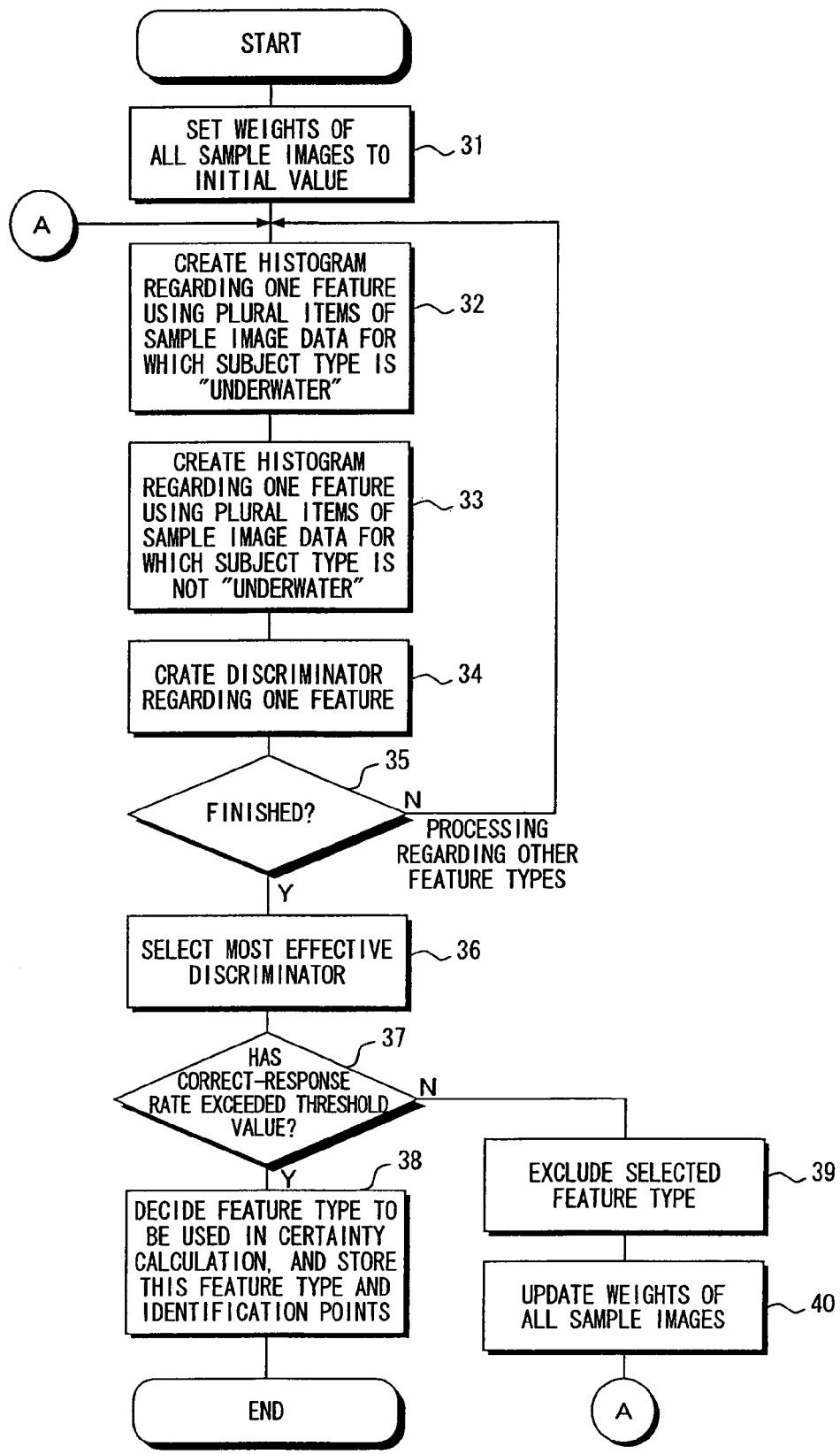
FIG. 6 is a flowchart illustrating the flow of creation of the certainty calculation memory.

Processing for creating the certainty calculation memory 21 will be described with reference to FIGS. 6 and 7. FIG. 6 is a flowchart illustrating the flow of processing for creating the certainty calculation memory 21, and FIG. 7 uses a histogram to illustrate the specific flow of calculation identification-point groups regarding one feature.

As mentioned above, types of features to be used in certainty calculation and identification-point groups corresponding to respective ones of the feature types are stored in the certainty calculation memory 21 in correspondence with respective ones of subject types with the exception of the subject types "human face" and "outside scope of detection". The creation of the certainty calculation memory 21 is performed by learning processing, described next.

Learning processing, namely processing for calculating types of features to be used in certainty calculation and processing for calculating identification-point groups corresponding to each of the features, will now be described taking the subject type "underwater" as a specific example.

A multiplicity of items of sample image data to undergo learning are prepared. The multiplicity of items of sample image data prepared are differentiated beforehand as sample images for which the subject type is assumed to be "underwater" (an image for which the area ratio of underwater colors is 50% or greater; see FIG. 3) (this shall be referred to as an "underwater sample image" below) and sample images for which the subject type should not be assumed to be "underwater" (an image in which underwater colors do not exist or for which the area ratio of underwater colors is less than 50%) (this shall be referred to as a "non-underwater sample image) (the situation is illustrated on the left side of FIG. 7).

Weights are assigned to all sample images to undergo learning (underwater sample images and all non-underwater sample images). First, weights assigned to all sample images are set to an initial value (e.g., "1") (step 31).

Figure 7:
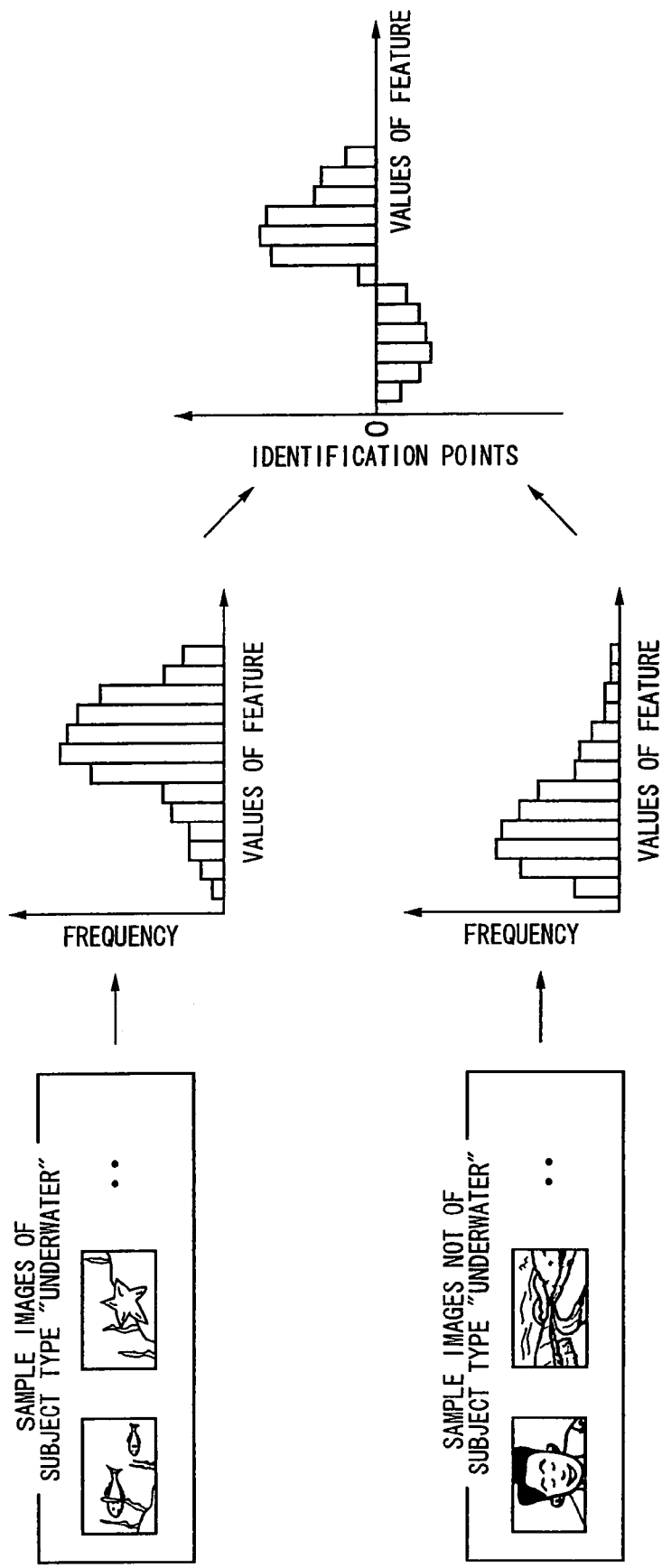
FIG. 7 illustrates the flow of creation of identification points stored in the certainty calculation memory.

A cumulative histogram regarding one feature is created using a plurality of underwater sample images (step 32; creation of the histogram shown at the top center of FIG. 7). For example, the "B-value average" that is one of the feature types is selected and a cumulative histogram regarding the selected feature type ("B-value average") is created.

Similarly, by using a plurality of non-underwater sample images, a cumulative histogram regarding one feature type ("B-value average" in the case of the above-mentioned example) is created (step 33; creation of the histogram shown at the bottom center of FIG. 7).

By employing the cumulative histogram regarding one feature type created using the plurality of underwater sample images and the cumulative histogram regarding one feature type created using the plurality of non-underwater sample images, logarithmic values of ratios of corresponding feature-value-to-feature-value frequency values are calculated. The result of representing the calculated logarithmic values by a histogram is the histogram illustrated on the right side of FIG. 7 (this histogram shall be referred to as a "discriminator" below). The discriminator is a set of logarithmic values corresponding to respective ones of feature values at prescribed intervals.

In the discriminator shown on the right side of FIG. 7, values (the above-mentioned logarithmic values) along the vertical axis are "identification points" (see FIG. 5). As will be described later, the certainty calculating circuit 12 calculates features regarding applied input image data and calculates identification point corresponding to the calculated feature value using the discriminator (the certainty calculation memory 21). In an input image having the feature value corresponding to a positive identification point, the possibility that the subject type should be construed to be "underwater" is great, and it can be said that the greater the absolute value of this value, the greater the possibility. Conversely, in an input image having the feature value corresponding to a negative identification point, the possibility that the subject type is not "underwater" is great, and it can be said that the greater the absolute value of this value, the greater the possibility.

Similarly, such discriminators are created with regard to respective ones of other feature types, e.g., a G-value average, B-value average, luminance Y average, color difference Cr average, color difference Cb average, saturation average, hue average, plurality of n % points and plurality of (m % points)-(n % points), etc. ("NO" at step 35; steps 32 to 34). A plurality of discriminators corresponding to respective ones of the plurality of feature types are created.

The discriminator most effective in order to judge that an image is of the subject type "underwater" is selected from among the plurality of discriminators selected (step 36). A correct-response rate is calculated in order to select the most effective discriminator. The correct-response rate is calculated according to Equation 3 below.

correct-response rate=number of correct-response sample images/total number of sample images    Equation 3

As mentioned above, underwater sample images and non-underwater sample image are known in advance. For example, with regard to an underwater sample image A, a value of one feature is calculated and identification points corresponding to the calculated feature value are obtained by the discriminator that corresponds to the type of this feature. If an identification point is a positive value, then the discriminator thereof treats this as indicating that a correct judgment could be made with regard to the underwater sample image A (the image is a correct-response sample image). The number of correct-response sample images is incremented. Conversely, if an identification point corresponding to the value of one feature calculated with regard to an underwater sample image B is a negative value, then the discriminator thereof treats this as indicating that a correct judgment could not be made with regard to the underwater sample image B (the image is an incorrect-response sample image).

With regard to a non-underwater sample image, if an identification point corresponding to a calculated feature value is a negative value, the discriminator treats this as indicating that a correct judgment could be made (the image is a correct-response sample image). The number of correct-sample images is incremented. If the identification point is a positive value, then the discriminator treats this as indicating that a correct judgment could not be made (the image is an incorrect-response sample image).

The above-described correct-response rates are calculated with regard to a plurality of discriminators created in association with respective ones of features of a plurality of types, and the discriminator that indicates the highest correct-response rate is selected as the most effective discriminator.

Next, it is determined whether the correct-response rate has exceeded a predetermined threshold value (step 37). In a case where the correct-response rate has exceeded the predetermined threshold value ("YES" at step 37), this is dealt with as indicating that the subject type "underwater" can be picked out with a sufficiently high probability if use is made of the selected discriminator. Learning processing then ends. The feature type corresponding to the selected discriminator and the identification-point group in the selected discriminator (the set of identification points corresponding to respective ones of the feature values at prescribed intervals) are stored in the certainty calculation memory 21 (step 38).

If the calculated correct-response rate is less than the predetermined threshold value ("NO" at step 37), then the processing set forth below is executed.

First, the feature type selected by the above-described processing is excluded from the object of processing (step 39).

Next, the weights of all sample images are updated (step 40).

In the updating of weights of the sample images, the weights of each of the sample images are updated so as to raise the weights of sample images for which correct responses could not be obtained (namely incorrect-response sample images) and lower the weights of sample images for which correct responses could be obtained (namely correct-response sample images), this being performed among all sample images. The reason for this is to emphasize images that could not be judged correctly with the selected discriminator, thereby making it possible to judge these images correctly. It should be noted that since the updating of weights need only result in a relative change between the weights of incorrect-response sample images and the weights of correct-response sample images, it will suffice if the updating is either that which raises the weights of incorrect-response sample images or that which lowers the weights of correct-response sample images.

Discriminators are created again with regard to respective ones of feature types, with the exception of the feature types that have been excluded, using the sample images whose weights have been updated (steps 32 to 35).

In the processing (steps 32, 33) for creating cumulative histograms in the processing for creating a discriminator from the second time onward, the weights that have been applied to each of the sample images are used. For example, if it is assumed that the weight that has been assigned to one sample image is "2", then the frequency is doubled in each of the histograms created based upon the sample image (the top and bottom histograms shown at the center of FIG. 7).

The most effective discriminator is selected from among the newly created discriminators (step 36). Weightings that have been applied to sample images are used also in the processing for selecting the most effective discriminator from the second time onward. For example, if the weighting of one sample image is "2", then, in a case where a correct response has been obtained with regard to this sample image, "2", not "1", is added to the number of correct-response sample images in Equation 3. As a result, emphasis is placed upon the fact that a sample image having a large weight is discriminated correctly more than an image having a small weight.

The correct-response rate with respect to a discriminator selected as the most effective discriminator in the initial cycle of processing and the correct-response rate with respect to a discriminator selected as the most effective discriminator in the second cycle of processing are added. If the correct-response rate that is the sum exceeds the predetermined threshold value, then these two discriminators are judged to be discriminators for discriminating the subject type "underwater".

If the correct-response rate still is less than the threshold value, similar processing is repeated further ("NO" at step 37; steps 39, 40, steps 32 to 36).

Thus, when three discriminators corresponding to the three features B-value average, B-value (80% point)–B value (20% point) and color difference Cb 70% point have been selected with regard to the subject type "underwater", these three discriminators are decided upon as discriminators that discriminate the subject type "underwater" if the correct-response rate exceeds the threshold value at step 37 ("YES" at step 37). The feature types identification-point groups in these three discriminators are stored in the certainty calculation memory 21 as indicated by the three lines at the top of FIG. 5.

The certainty calculation memory 21 (FIG. 5) is completed by executing the foregoing processing with regard to subject types (in this embodiment, the six subject types "underwater", "high saturation", "sunset scene", "night scene", "blue sky" and "high key") other than the subject types "human face" and "outside scope of detection".

Figure 8:
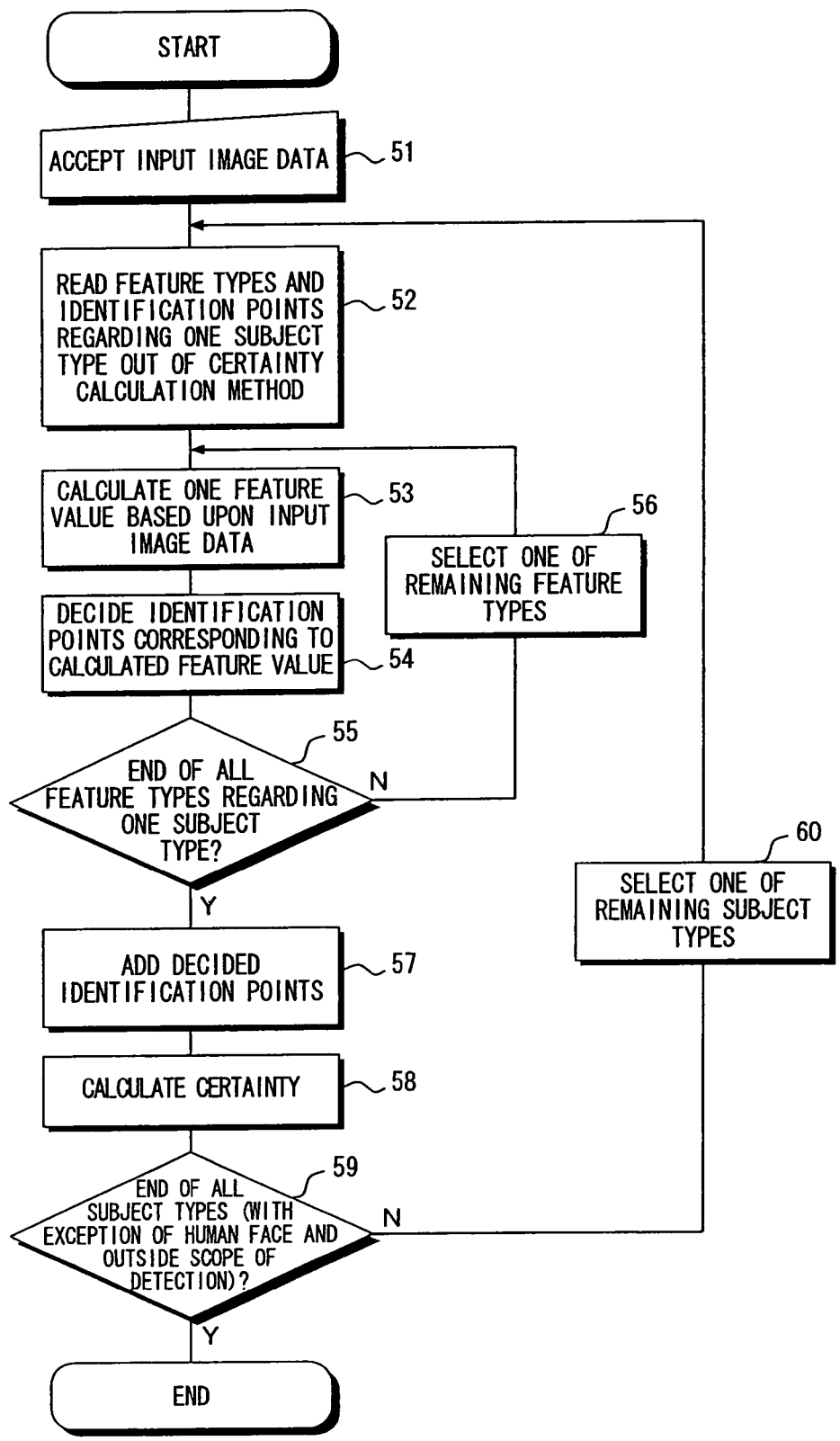
FIG. 8 is a flowchart illustrating the flow of processing for calculating certainty.

FIG. 8 is a flowchart illustrating processing for calculating certainties of subject types (the six subject types "underwater", "high saturation", "sunset scene", "night scene", "blue sky" and "high key") other than the subject types "human face" and "outside scope of detection" with regard to an input image using the certainty calculation memory 21. The processing for calculating certainties with regard to respective ones of the subject types ("underwater", "high saturation", "sunset scene", "night scene", "blue sky" and "high key") other than the subject types "human face" and "outside scope of detection" is executed in the certainty calculating circuit 12.

The input image data that has been read out of the storage unit 4 is applied to the certainty calculating circuit 12 (step 51).

The feature types and identification-point groups regarding one subject type (e.g., "underwater") are read out of the certainty calculation memory 21 and stored in a temporary storage memory (not shown) (step 52).

On the basis of the input image data, the feature value regarding a feature type (any one of a plurality of feature types) that has been stored in the temporary storage unit is calculated. For example, in the case of the subject type "underwater", the feature types for calculating the degree of certainty of this subject type are the three feature types B-value average, B-value (80% point)–B value (20% point) and color difference Cb 70% point. The value of one feature type (e.g., B-value average) among these three feature types is calculated based upon the input image data (step 53).

The identification point corresponding to the calculated feature value is decided based upon the identification-point group that has been stored in the temporary storage memory (step 54).

It is determined whether identification points have been decided with regard to all feature types corresponding to the one subject type (step 55). If remaining feature types exist, one of the remaining feature types is selected. Then, with regard to the selected feature type, the feature value is calculated and the identification point corresponding to the calculated feature value is decided through processing similar to that described above ("NO" at step 55; step 56, steps 53, 54).

When identification points regarding all feature types corresponding to one subject type are decided, the decided identification points are added (this shall be referred to as a "summed identification point" below) ("YES" at step 55; step 57).

Figure 9:
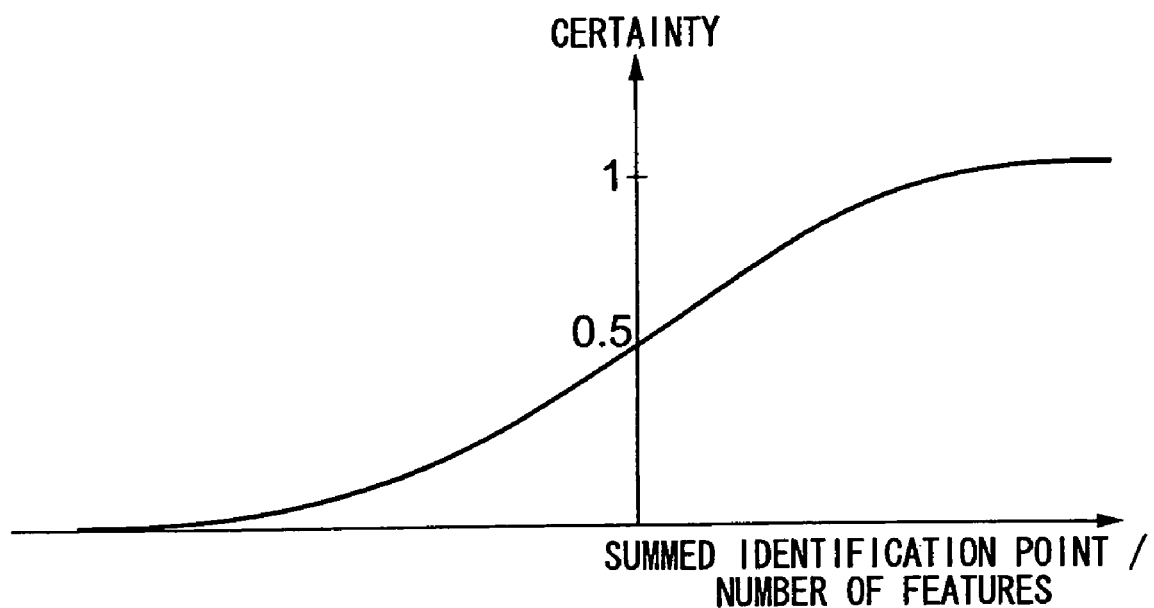
FIG. 9 is a graph representing a function used in order to calculate certainty calculated based upon identification points.

Certainty is calculated in accordance with the value of the summed identification point and the number of feature types that correspond to the one subject type (step 58). FIG. 9 illustrates in the form of a graph one example of a function used in calculating certainty. On the basis of the function illustrated in FIG. 9, certainty (a value of 0 to 1), which conforms to a value obtained by dividing the summed identification point by the number of feature types, is calculated. The calculated certainty with respect to one feature type is stored in the temporary storage memory.

The above-described processing is executed with regard to each of the subject types (the six subject types "underwater", "high saturation", "sunset scene", "night scene", "blue sky" and "high key") other than the subject types "human face") and "outside scope of detection" ("NO" at step 59; step 60).

The certainties regarding respective ones of the subject types "underwater", "high saturation", "sunset scene", "night scene", "blue sky" and "high key" are stored in the temporary storage memory ("YES" at step 59) (function blocks 12b to 12g).

Next, calculation of certainty regarding the subject type "human face" will be described.

Figure 10:
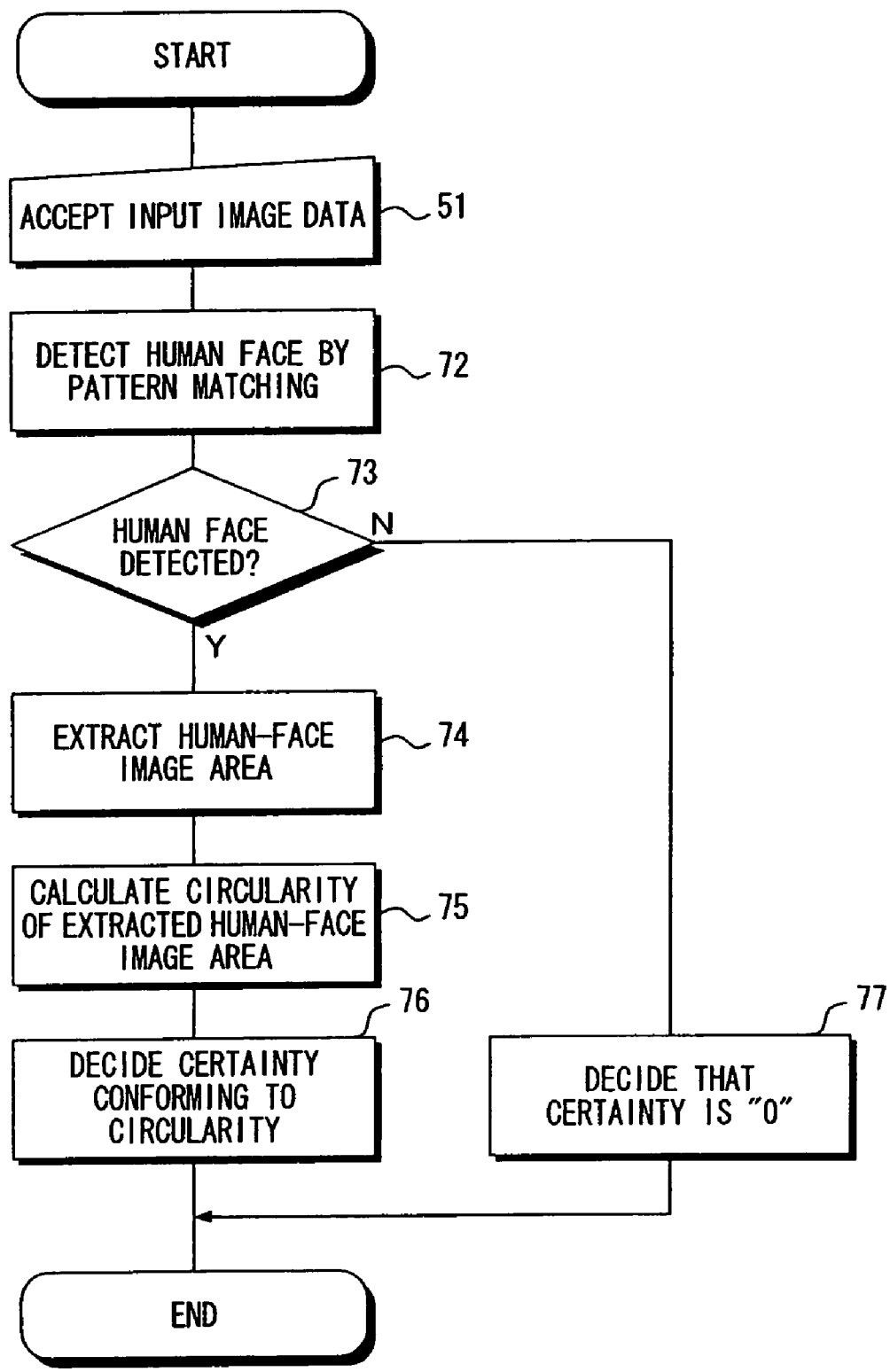
FIG. 10 is a flowchart illustrating the flow of processing for calculating certainty regarding a human face.

FIG. 10 is a flowchart illustrating the flow of processing for calculating certainty regarding the subject type "human face". The certainty calculation processing is executed in the certainty calculating circuit 12 with regard to the subject type "human face" as well.

The input image data used is the same as that used in calculating certainty regarding each of "underwater", "high saturation", "sunset scene", "night scene", "blue sky" or "high key" mentioned above (step 51).

Whether the image represented by the input image data contains an image portion representing a human face is detected by pattern matching (e.g., pattern matching utilizing a light and dark pattern of a typical human face) (step 72). Pattern data of a plurality of sizes has been stored in the human-face pattern data memory 22 connected to the certainty calculating circuit 12, and whether the input image contains an image portion representing a human face is detected using each of the plurality of items of pattern data.

If it is judged based upon pattern matching that the input image does not contain a human face, then the certainty of the subject type "human face" is decided to be "0" ("NO" at step 73; step 77).

If it is judged based upon pattern matching that the input image contains a human face ("YES" at step 73), then the approximate center (e.g., relative coordinates) of the human face and the approximate size thereof (based upon the size of the pattern data used in pattern matching) are obtained by pattern matching. A rectangular area that contains the human face (a rectangular area in which it is highly likely that a human face is contained) is cut from the input image based upon the approximate center and approximate size of the obtained human face. Of course, it may be so arranged that the input image is displayed on the display screen of the display unit 3 and the operator of the image processing system designates a rectangular area containing the human face (in this case, processing for detecting a human face by pattern matching will not be necessary). Processing for extracting a human-face image area is executed based upon the rectangular area image cut (designated) from the input image (step 74).

Various kinds of processing can be employed in processing for extracting a human-face image area.

By way of example, based upon image data representing the rectangular area, color data (RGB) of pixels of the same system color are converted to prescribed values, whereby there is created image data that is a collection of pixels having skin-tone and near-skin-tone color data, pixels having white and near-white color data and pixels having black and near-black color data, etc. Portions in which edges do not exist are subsequently consolidated and skin-tone and near-skin-tone portions in the consolidated image portion are adopted as the human-face image area.

In the rectangular area represented by the image data that represents the rectangular area, edge positions (positions of the boundary between skin tone and other colors) can be decided with regard to respective ones of directions (e.g., 64 directions) from the center to the periphery, and an area stipulated by connecting the 64 edge positions decided can also be adopted as the human-face image area.

If image data representing the human-face image area is extracted from the image data representing the rectangular area, the circularity of the extracted human-face image area is calculated (step 75). Circularity is calculated according to Equation 4 below.

$$\text{Circularity} = (\text{perimeter } L \times \text{perimeter } L)/\text{area } S \quad \text{Equation 4}$$

Certainty conforming to the circularity calculated according to Equation 4 is decided (step 76). In the decision of certainty conforming to circularity, the function (graph) illustrated in FIG. 9 may be used or some other function may be used.

The decided certainty regarding the subject type "human face" also is stored in the temporary storage memory (function block 12a).

In a case where the input image contains a plurality of human faces, certainties regarding respective ones of the human faces are calculated and the average thereof is calculated. The calculated average value is adopted as certainty regarding the subject type "human face".

When certainties regarding respective ones of all subject types ("human face", "underwater", "high saturation", "sunset scene", "night scene", "blue sky" and "high key") with the exception of the subject type "outside scope of detection" are calculated, certainty regarding the subject type "outside scope of detection" is detected using these calculated certainties.

Certainty Pot regarding the subject type "outside scope of detection" is calculated according to Equation 5 below (function block 12h).

$$Pot = 1 - \text{MAX}(P_1, P_2, \ldots, P_7) \quad \text{Equation 5}$$

Here $P_1, P_2, \ldots, P_7$ represent certainties of subject types other than the subject type "outside scope of detection", and $\text{MAX}(P_1, P_2, \ldots, P_7)$ represents the maximum value among $P_1, P_2, \ldots, P_7$.

Through processing thus far, certainties (a total of eight certainties) regarding respective ones of all of the subject types "human face", "underwater", "high saturation", "sunset scene", "night scene", "blue sky", "high key" and "outside scope of detection" are calculated with regard to the input image.

Processing executed by the density correction value calculating circuit 13 will be described next.

The density correction value calculating circuit 13 is a circuit for obtaining density correction values of respective ones of the subject types "human face", "underwater", "high saturation", "sunset scene", "night scene", "blue sky", "high key" and "outside scope of detection" based upon the input image data. In the certainty calculation processing described above, a density correction value regarding a subject type for which the certainty was "0" need not necessarily be obtained.

Calculation of density correction values regarding respective ones of the subject types "human face", "underwater", "high saturation", "sunset scene", "night scene", "blue sky", "high key" and "outside scope of detection" will now be described.

(1) Calculation of Density Correction Value of Subject Type "human face" (Function Block 13a)

In the certainty calculating circuit 12 described above, a plurality of human-face image areas contained in the input image and certainties corresponding to respective ones of these areas are obtained and these are applied to the density correction value calculating circuit 13. Based upon the applied plurality of human-face image areas and certainties corresponding to respective ones of these areas, the density correction value calculating circuit 13 specifies the pixels constituting the human faces and calculates an average density that has been weighted by the corresponding certainty.

The density correction value calculating circuit 13 then calculates correction coefficients such that the weighted average density that has been calculated will become a target density (a set value). Based upon the calculated correction coefficients, the density correction value calculating circuit 13 creates a density correction value [a table or function that stipulates output densities (0 to 4095) corresponding to respective ones of input densities (0 to 4095)] (in the case of a 12-bit density scale).

(2) Calculation of Density Correction Value of Subject Type "Underwater" (Function Block 13b)

From among pixels constituting the input image, pixels in a range of colors from blue to green are detected and density, and density for which visual density will be minimized is obtained from among these pixels. Correction coefficients for which the minimum visual density will become a target density (a set value) are calculated and a density correction value is calculated based upon the calculated correction coefficients. It should be noted that visual density is a density obtained by weighting C, M and Y densities at the ratio 3:6:1; it is proportional to brightness.

(3) Calculation of Density Correction Value of Subject Type "High Saturation" (Function Block 13c)

From among pixels constituting the input image, pixels possessing a hue having the highest saturation are detected, and density for which visual density will be minimized is obtained from among these pixels. Correction coefficients for which the minimum visual density will become a target density (a set value) are calculated and a density correction value is calculated based upon the calculated correction coefficients.

(4) Calculation of Density Correction Value of Subject Type "Sunset Scene" (Function Block 13d)

In a case where the input image is the image of a sunset, pixels having a color that belongs to the range of orange colors exist in the input image. The pixels having the range of orange colors are detected and a density for which the visual density will be minimized is obtained from among these pixels. Correction coefficients for which the minimum visual density will become a target density (a set value) are calculated and a density correction value is calculated based upon the calculated correction coefficients.

(5) Calculation of Density Correction Value of Subject Type "Night Scene" (Function Block 13e)

In a case where the input image is the image of a night scene, low-density pixels (highlight portions) and high-density pixels (shadow portions) exist. Calculated is a density correction value for which the minimum density becomes the target density (a set value) of a highlight and the maximum density becomes a target density (a set value) of a shadow.

(6) Calculation of Density Correction Value of Subject Type "Blue Sky" (Function Block 13f)

In a case where the input image is the image of a blue sky, pixels having colors that belong to the cyan blue range of colors exist in the input image. The pixels having colors belonging to the cyan blue range of colors are detected and a density for which the visual density will be minimized is obtained from among these pixels. Correction coefficients for which the minimum visual density will become a target density (a set value) are calculated and a density correction value is calculated based upon the calculated correction coefficients.

(7) Calculation of Density Correction Value of Subject Type "High Key" (Function Block 13g)

In a case where the input image is a high key image, pixels having colors that belong to the white range of colors exist in the input image. The pixels having colors belonging to the white range of colors are detected and a density for which the visual density among C, M, Y will be minimized is obtained from among these pixels. Correction coefficients for which the minimum visual density will become a target density (a set value) are calculated and a density correction value is calculated based upon the calculated correction coefficients.

(8) Calculation of Density Correction Value of Subject Type "Outside Scope of Detection" (Function Block 13h)

Visual densities of all pixels constituting the input image are calculated, correction coefficients for which the average value of these densities will become a target density (a set value) are calculated and a density correction value is calculated based upon the calculated correction coefficients.

It goes without saying that the methods of calculating density correction values regarding each of the subject types are not limited to those described above. For example, in terms of the subject type "human face", minimum density and maximum density may be calculated (detected) besides average density of pixels constituting the human face, a correction function for which average density, minimum density and maximum density will become the corresponding target densities (target average density, target minimum density and target maximum density) may be calculated, and the calculated correction function may be adopted as the density correction values. In a case where the density correction values are represented by a graph, the graph may be linear or a curve.

The density correction value Ti(s) regarding each of the plurality of subject types calculated by the density correction value calculating circuit 13, the certainty Pi regarding each of the plurality of subject types calculated by the certainty calculating circuit 12, and the degree Si of importance regarding each of the plurality of subject types input using the input unit 2 are applied to the density correction value unifying circuit 14. The unified density correction value T(s) is calculated in the density correction value unifying circuit 14 according to Equations 1, 2 cited above (function block 14a).

Creation of the unified density correction value in the density correction value unifying circuit 14 will be described concretely with reference to FIGS. 11 and 12.

For example, in a case where the certainty obtained from the input image is 0.6 with regard to the subject type "human face", 0.1 with regard to "blue sky" and 0 with regard to the other subject types, the certainty with regard to "outside scope of detection" becomes 0.4 according to Equation 5 (FIG. 11). In accordance with Equation 2, weight Vfa (=0.55) of the subject type "human face", weight Vbs (=0.09) of "blue sky" and weight Vot (=0.36) of "outside scope of detection" are calculated. Further, degrees of Sfa, Sbs, Sot of importance regarding respective ones of the subject types "human face", "blue sky" and "outside scope of detection" are input by the operator of the image processing system. Here "human face" importance degree Sfa=0.6, "blue sky" importance degree Sbs=0.1 and "outside scope of detection" importance degree Sot=0.3 are assumed to hold.

Figure 12:
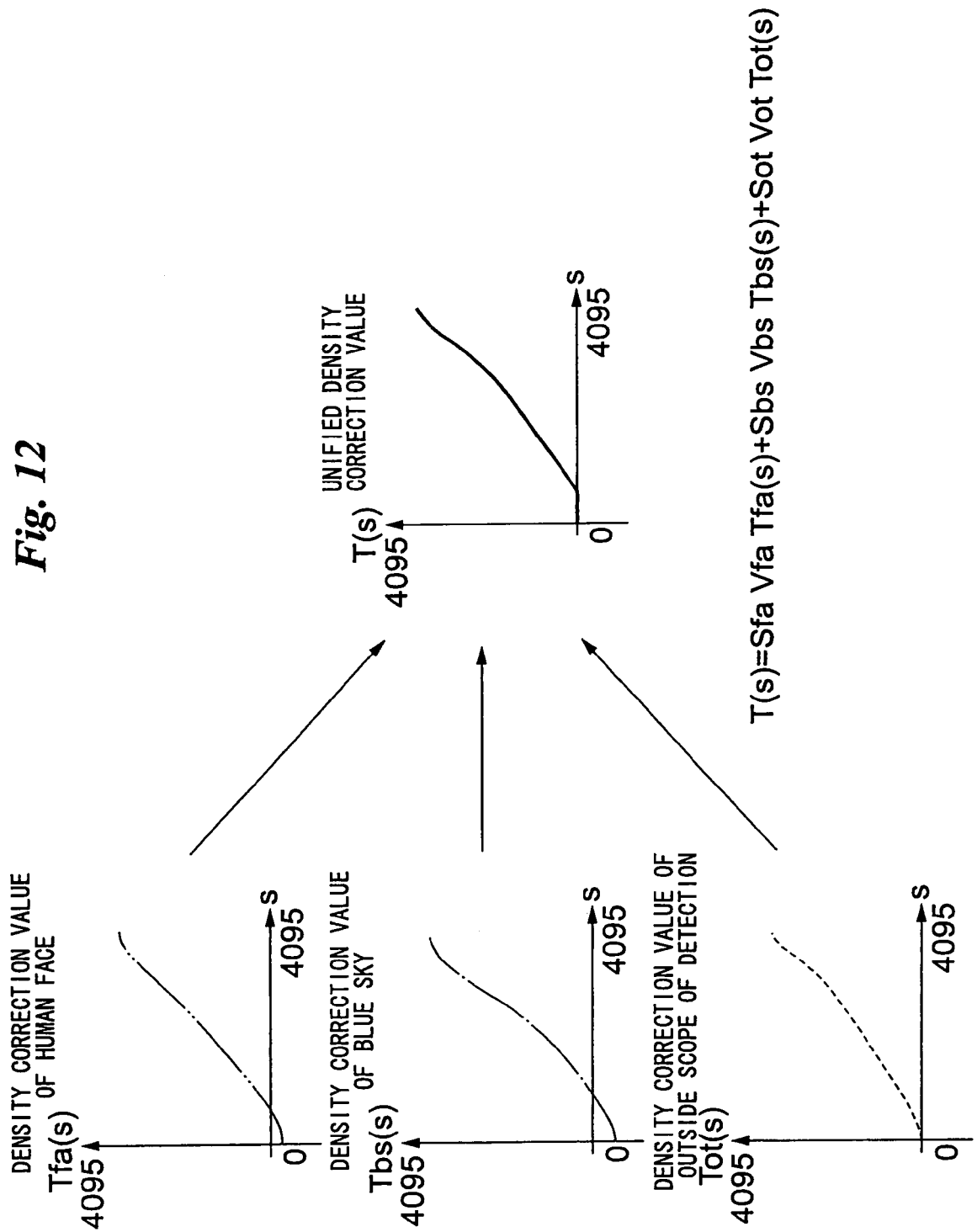
FIG. 12 illustrates the manner in which density correction values are unified.

Weights Vfa, Vbs, Vot regarding respective ones of the subject types "human face", "blue sky" and "outside scope of detection" calculated based upon certainties obtained from the input image and the importance degrees Sfa, Sbs, Sot regarding respective ones of the subject types "human face", "blue sky" and "outside scope of detection" that have been input by the operator are multiplied by the density correction values [Tfa(s), Tbs(s), Tot(s)] of respective ones of the subject types "human face", "blue sky" in accordance with Equation 1 [the density correction values Tfa(s), Tbs(s), Tot(s) are indicated by the graphs on the left side of FIG. 12]. The result of summing these is adopted as the unified density correction value T(s). It should be noted that in the graphs of the density correction values Tfa(s), Tbs(s) of the subject types "human face" and "blue sky" shown on the left side of FIG. 12, there are portions in which the values of the output density values [Tfa(s), Tbs(s)] corresponding to the input density values (s) take on negative values (levels). This is due to the fact that the target values are set in such a manner that the density correction values are calculated in a direction that will brighten the image. In the finally obtained unified density correction value T(s), the portions in which the output density values take on negative values are clipped in such a manner that the output density values will become any of density levels ranging from 0 to 4095 [see the graph of the unified density correction value T(s) on the right side of FIG. 12].

The input image data is corrected in the image correcting circuit 15 using the unified density correction value T(s) thus created.

Figure 13:
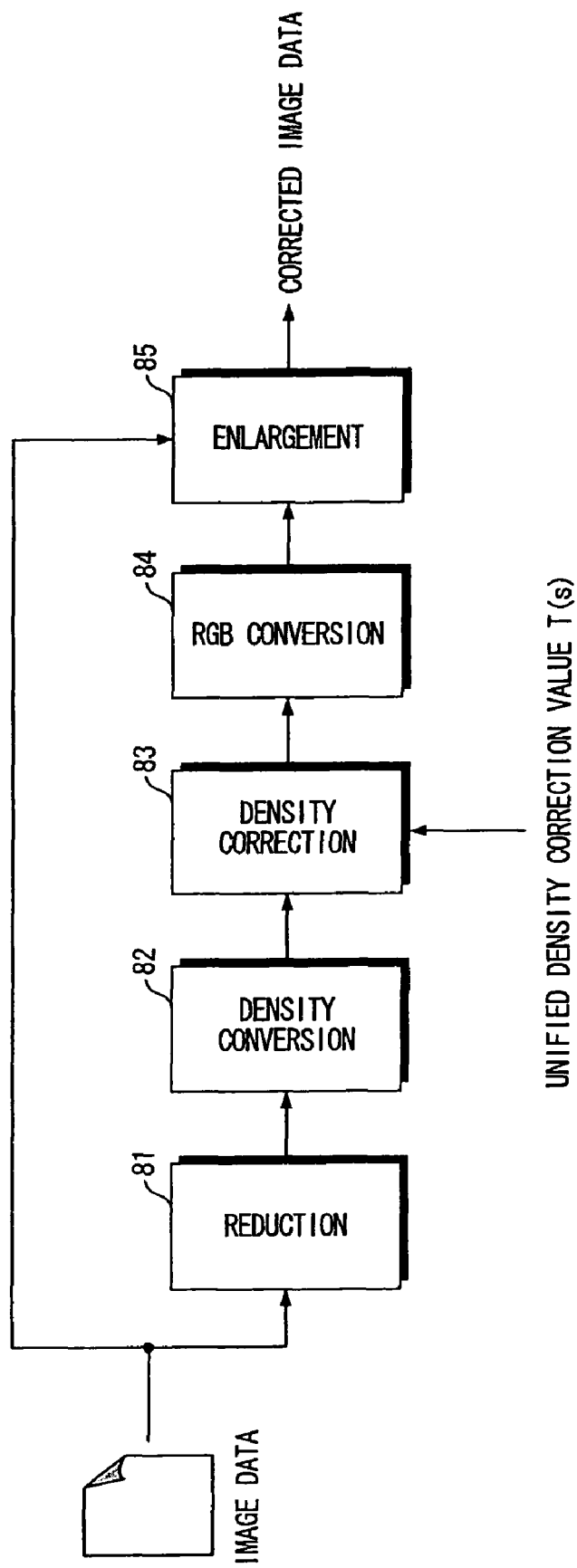
FIG. 13 is a block diagram illustrating the details of an image data correcting circuit.

FIG. 13 is a functional block diagram of the image correcting circuit 15.

Input image data identical with the input image data that has been applied to the above-described certainty calculating circuit 12 and density correction value calculating circuit 13 is applied to the image correcting circuit 15.

Reduction processing is executed (function block 81). Reduction processing reduces the number of pixels in an image having a large number of pixels, thereby shortening processing time in grayscale conversion processing, grayscale correction processing and RGB conversion processing executed next. It should be noted that reduction processing is carried out in a case where image data that has undergone a density correction is output upon being reduced in size. Reduction processing is not carried out in a case where image data that has undergone a density correction is output upon being enlarged in size.

Density regarding each of the pixels constituting the reduced input image is calculated (function block 82).

The density of each pixel in the image that has undergone the size reduction is corrected using the unified density correction value T(s) described above (function block 83).

The pixel-by-pixel RGB values of the input image are calculated (converted) base upon the density after correction (function block 84). Finally, enlargement processing is executed (function block 85). It should be noted that enlargement processing is carried out in a case where an image that has undergone a density correction is output upon being enlarged in size. Enlargement processing is not carried in a case where an image that has undergone a density correction is output upon being reduced in size.

The density-corrected image data that has been output from the image correcting circuit 15 is output from the image processing apparatus 1. The corrected image data that has been output is applied to an printed by the printer 5. When necessary the image data is applied to the display unit 3 and displayed on the display screen thereof. It goes without saying that the corrected image data may be stored in the storage unit 4.

Thus, in the image processing apparatus 1, the types of subjects contained in an image represented by input image data are identified (detected) automatically, the certainties of respective ones of the identified subject types are calculated, and the unified density correction value T(s) is calculated based upon the certainties calculated and degrees of importance entered by the operator. Density correction processing that is in accordance with the calculated unified density correction value T(s) is executed. The unified density correction value T(s) is one calculated in accordance with the certainties of the subject types contained in the input image. Therefore, even if the image is one in which two subject types, for example, exist, an appropriate density correction can be achieved.

Modification 1

Figure 14:
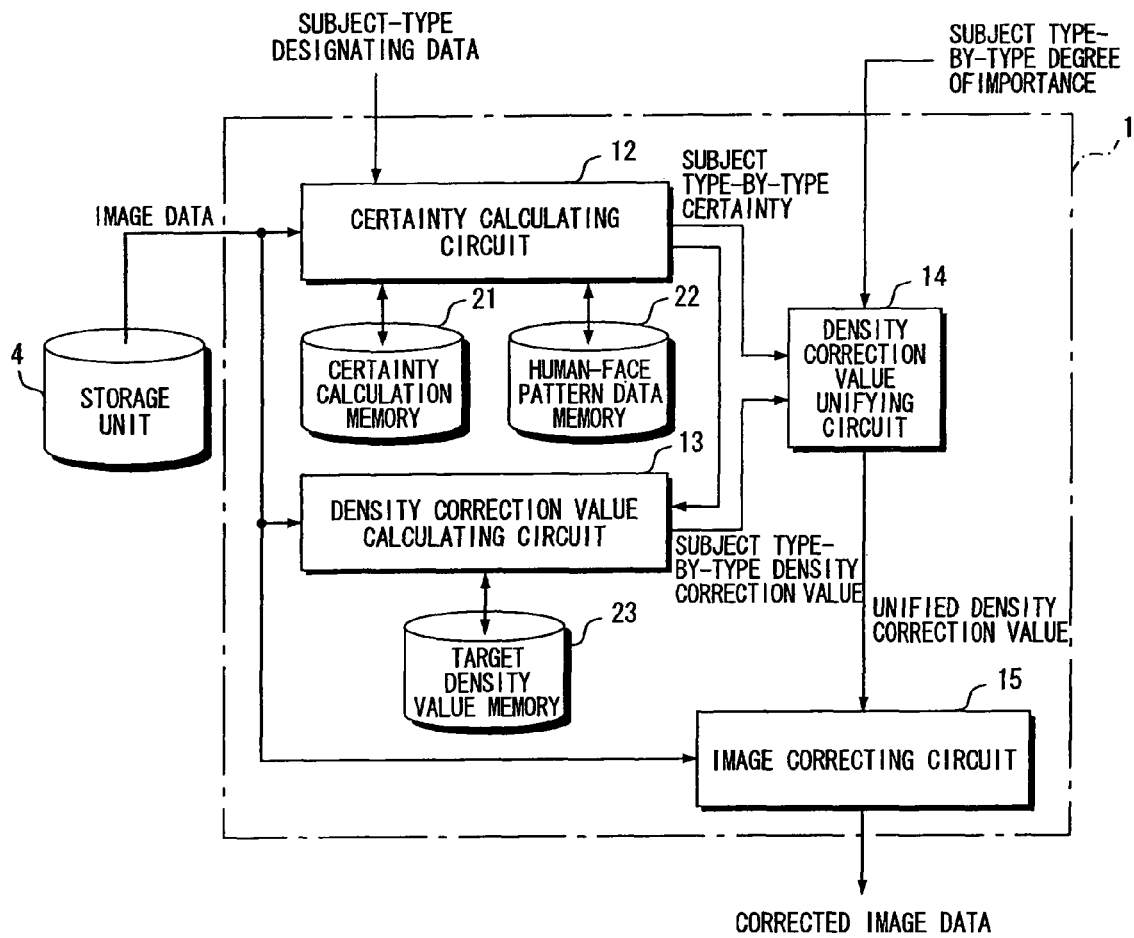
FIG. 14 is a block diagram illustrating the electrical structure of an image processing apparatus according to a modification of the first embodiment.

FIG. 14 is a block diagram illustrating the electrical structure of the image processing apparatus 1 in a modification of the first embodiment. This apparatus differs from the image processing apparatus 1 shown in FIG. 2 in that subject-type designating data is input to the certainty calculating circuit 12 included in the image processing apparatus 1.

The subject-type designating data is data for designating which subject type is to be identified (which certainty is to be calculated) among the subject types identified by the image processing apparatus 1. This data is input by the operator of the image processing system using the input unit 2 and is applied to the certainty calculating circuit 12.

In a case where it is known in advance that the input image represented by the input image data applied to the image processing apparatus 1 does not contain the subject type "night scene", for example, it is unnecessary to calculate the certainty and density correction value regarding the subject type "night scene". In this case, data designating the other subject types with the exception of the subject type "night scene" is assumed to be the subject-type designating data. The certainties regarding respective ones of the designated subject types are calculated in the certainty calculating circuit 12. The certainty and density correction value regarding a subject type not designated are not calculated. This makes it possible to shorten processing time of certainty calculation processing in the certainty calculating circuit 12 and processing time of density correction value calculating processing in the density correction value calculating circuit 13. Further, in the case of the example mentioned above, the density correction value regarding the subject type "night scene" is not merged into the unified density correction value T(s). This makes it possible to particularly improve correction accuracy in the case of an image in which degree of certainty regarding the subject type "night scene" is obtained regardless of the face that the subject type "night scene" does not exist.

It may be so arranged that the designating data of a subject type for which certainty is not to be calculated is applied to the certainty calculating circuit 12. In this case, certainties are calculated in the certainty calculating circuit 12 with regard to respective ones of subject types except for the designated subject type. Calculation of certainty regarding the designated subject type is not carried out (neither is calculation of the density correction value in the density correction value calculating circuit 13).

In the accepting of subject-type designating data, it may be so arranged that instead of directly designating a subject type capable of being identified (capable of having its certainty calculated) in the image processing apparatus 1, designation based upon another form of expression, e.g., an "ID photograph", is accepted. An ID photograph is a subject type that is solely a human face. If the fact that an input image is an "ID photograph" is accepted, therefore, the image processing apparatus 1 calculates certainty only with regard to the subject type "human face" and calculates a density correction value only with regard to this subject type. (Naturally, in a case where only one subject type has been designated, the certainty regarding this subject type may be made the maximum value.) Further, in a case where only one subject type has been designated, the unified density correction value becomes equal to the density correction value regarding the designated subject type.

Modification 2

Figure 15:
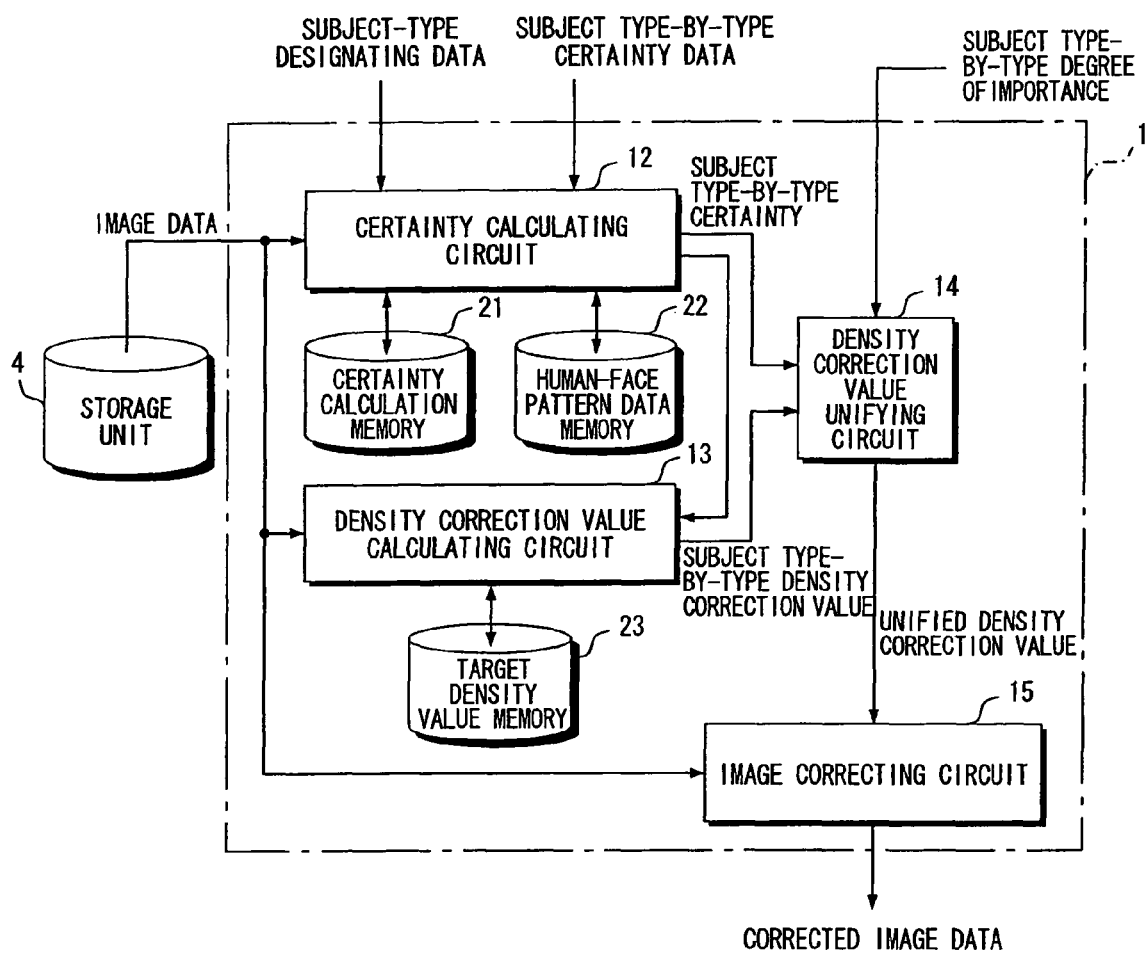
FIG. 15 is a block diagram illustrating the electrical structure of an image processing apparatus according to a modification of the first embodiment.

FIG. 15 is a block diagram illustrating the electrical structure of the image processing apparatus 1 in another modification of the first embodiment. This apparatus differs from the image processing apparatus 1 shown in FIG. 14 in that subject type-by-type certainty data is input to the certainty calculating circuit 12 included in the image processing apparatus 1.

In a case where an image represented by image data to be processed is known in advance (a case where an image to be processed has already been ascertained by the operator of the image processing system), the subject type-by-type certainty data is input by the operator of the image processing system using the input unit 2 and is applied to the certainty calculating circuit 12.

Assume that it is known that the input image to be processed is an image having blue sky in the background and a person in the foreground. In this case, human-face certainty 0.5 and blue-sky certainty 0.5, for example, are input from the input unit 2 as the subject type-by-type certainty data. The certainty calculating circuit 12 outputs the entered certainties (input-face certainty and blue-sky certainty) as is and does not execute certainty calculation processing. Since certainty calculation processing is not executed, time for certainty calculation processing is not required and the processing time of image correction processing can be shortened.

Modification 3

Figure 16:
FIG. 16 illustrates an example of a screen for accepting revision of subject type-by-type certainties.

It may be so arranged that the subject type-by-type certainties that have been calculated by the certainty calculating circuit 12 are displayed on a display screen together with an image to be processed and revision of the subject type-by-type certainties by the operator is accepted. FIG. 16 illustrates an example of a display that accepts revision of certainties on a subject type-by-type basis. Revision of respective ones of subject type-by-type certainties calculated by the certainty calculating circuit 12 is accepted using the display screen and input unit 2. In this case, the subject type-by-type certainties revised by the operator are output from the certainty calculating circuit 12.

Second Embodiment

Figure 17:
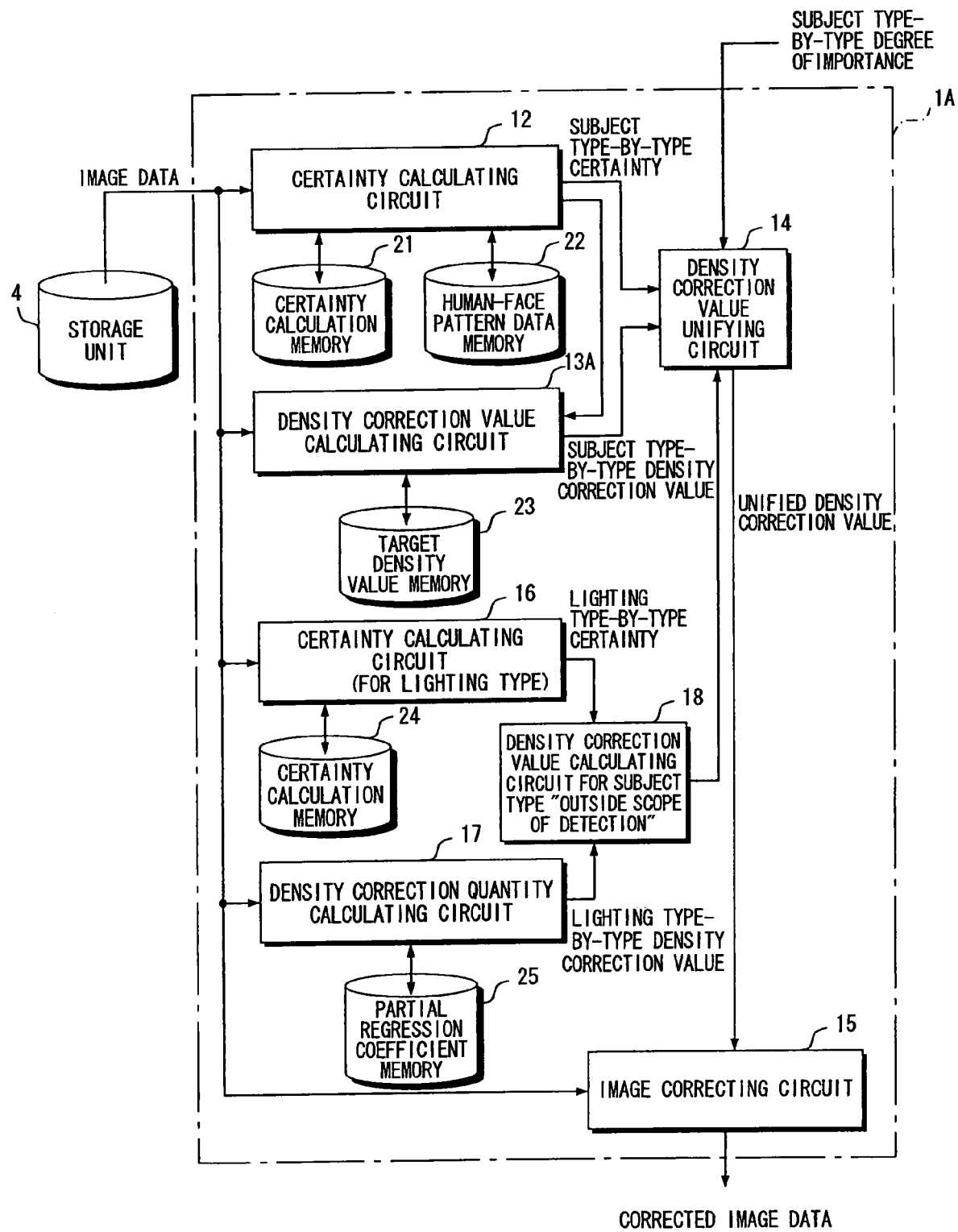
FIG. 17 is a block diagram illustrating the electrical structure of an image processing apparatus according to a second embodiment.

FIG. 17 is a block diagram illustrating the electrical structure of an image processing apparatus 1A in a second embodiment. This apparatus differs from the image processing apparatus 1 of the first embodiment shown in FIG. 2 in that it is further provided with a certainty calculating circuit 16, a density correction quantity calculating circuit 17, a density correction value calculating circuit 18 for subject type "outside scope of detection", and memories 24, 25. Further, as will be described later, processing in a density correction value calculating circuit 13A regarding subject type differs from that of the first embodiment.

In the image processing apparatus 1A of the second embodiment, a density correction value regarding the subject type "outside scope of detection" is not calculated in a density correction value calculating circuit 13A regarding subject type. The density correction value calculating circuit 13A of the second embodiment differs from the density correction value calculating circuit 13 of the first embodiment is this respect. The certainty calculating circuit 16 (for lighting type), density correction quantity calculating circuit 17, density correction value calculating circuit 18 for subject type "outside scope of detection", and memories 24, 25 are used in calculating the density correction value regarding the subject type "outside scope of detection".

Images represented by input image data include not only those captured under standard lighting conditions such as those outdoors but also images captured under non-standard lighting conditions such as "backlight", "proximity strobe" and "tungsten". Under non-standard lighting conditions, the certainty calculating circuit for subjects cannot always correctly identify a subject type, and there are instances where the certainty of the subject type "outside scope of detection" is elevated.

For example, if a person is photographed in a back-lit state, the person in the image obtained will appear dark and the surroundings will appear bright. With regard to an image of this kind, there is a possibility that the image processing apparatus 1 will lower the degree of certainty of the subject type "human face" and raise the degree of certainty of the subject type "outside scope of detection". Taking note of these facts, the image processing apparatus 1A, besides performing the functions of the image processing apparatus 1 of the first embodiment, further identifies the lighting type and, in a manner similar to that of the first embodiment, calculates certainties regarding respective ones of lighting types, thereby improving the accuracy of the density correction of an image possessing a degree of certainty of the subject type "outside scope of detection" in accordance with the lighting type.

The lighting type of an input image represented by input image data is identified and the certainty thereof calculated in the certainty calculating circuit (for lighting type) 16 included in the image processing apparatus 1A.

Figure 19:
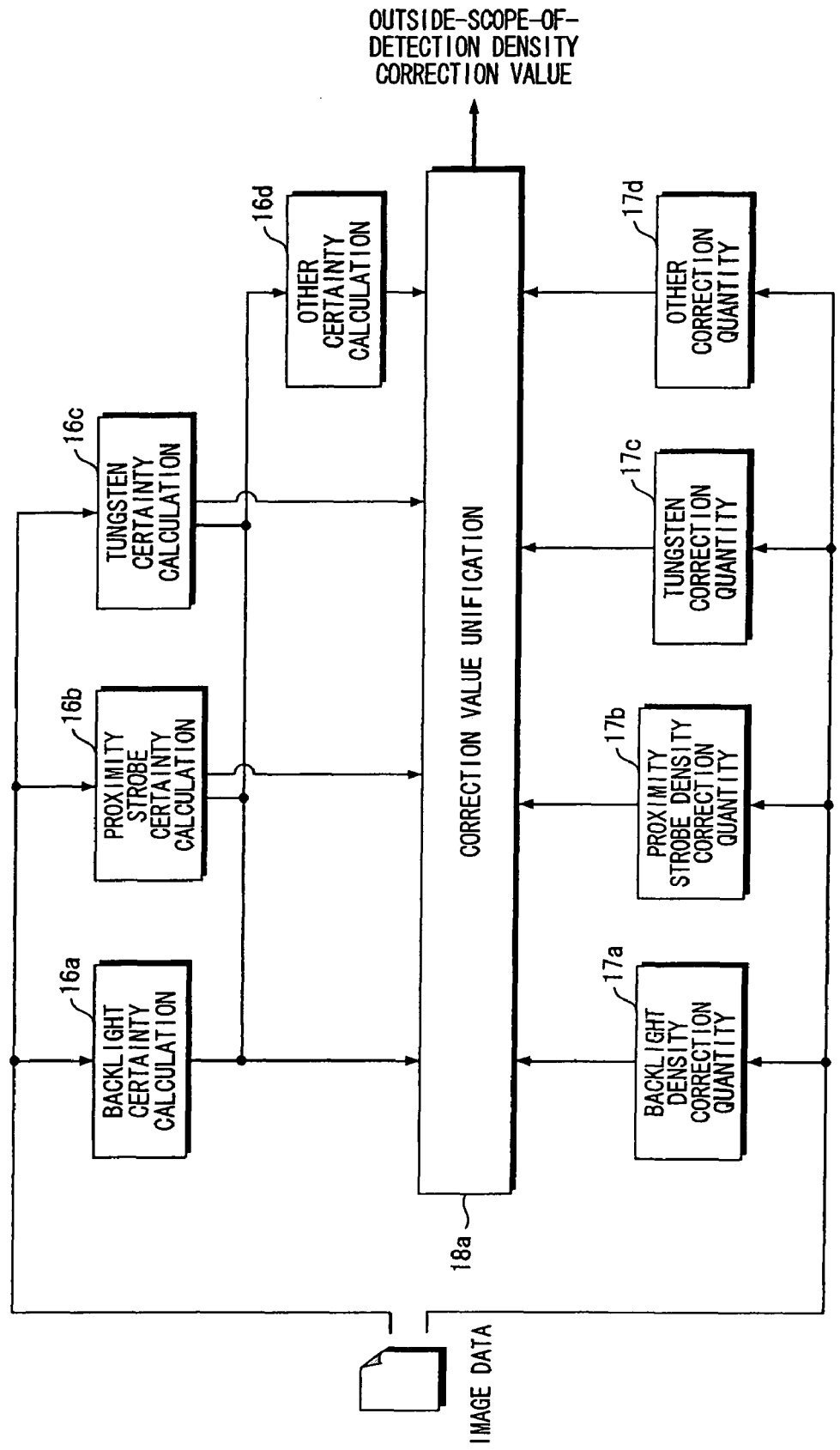
FIG. 19 is a functional block diagram illustrating the functions of a certainty calculating circuit (for lighting type), density correction value calculating circuit and circuit for calculating a density correction value for the subject type "outside scope of detection".

FIG. 18 illustrates lighting types identified (detected) by, and whose degrees of certainty have been calculated by, the certainty calculating circuit (for lighting type) 16, examples of images corresponding to these lighting types, and definitions of the lighting types. FIG. 19 is a functional block diagram illustrating the functions of the certainty calculating circuit (for lighting type) 16, density correction value calculating circuit 17 and density correction value calculating circuit 18 for subject type "outside scope of detection".

The certainty calculating circuit (for lighting type) 16 calculates certainties (lighting certainties) regarding the lighting types "backlight", "proximity strobe" and "tungsten" in a manner similar to that of the above-described certainty calculating circuit 12 regarding the subject types (functions blocks 16a to 16c of FIG. 17). That is, the certainty calculating circuit 16 executes learning processing regarding respective ones of the lighting types "backlight", "proximity strobe" and "tungsten" and creates discriminators regarding respective ones of a plurality of feature types (e.g., an average density value at the central portion of the image, an average density value at the peripheral portion of the image, and the difference between the average density value of the central portion of the image and the average density value at the peripheral portion of the image. Selected from among the plurality of discriminators created is a discriminator corresponding to a feature type that is appropriate in order to identify the image of each lighting type. The feature type and identification-point group corresponding to the selected discriminator are stored in the memory 24 (referred to below as "memory 24 for lighting certainty calculation") connected to the certainty calculating circuit (for lighting type) 16. The identification points corresponding to the feature type obtained from the input image data are calculated using the memory 24 for lighting certainty calculation, and the certainty (lighting certainty) conforming to the identification points (or summed identification points) is obtained.

Furthermore, a lighting certainty regarding a lighting types other than the lighting types "backlight", "proximity strobe" and "tungsten" (such a lighting type shall be referred to as lighting type "other" below) also is calculated using the certainties of respective ones of the lighting types "backlight", "proximity strobe" and "tungsten" in a manner similar to the calculation of the certainty regarding the subject type "outside scope of detection" of the first embodiment (function block 16d). Certainty Qot regarding a lighting type "outside scope of detection" is calculated according to Equation 6 below.

$$Qot = 1 - MAX(Q_1, Q_2, Q_3) \qquad \text{Equation 6}$$

Here $Q_1$, $Q_2$, $Q_3$ represent certainties of respective ones of lighting types other than the lighting type "other". $MAX(Q_1, Q_2, Q_3)$ represents the maximum value among $Q_1$, $Q_2$, $Q_3$.

The density correction quantity calculating circuit 17 will be described next.

The density correction quantity calculating circuit 17 obtains density correction quantities of respective ones of the lighting types "backlight", "proximity strobe", "tungsten" and "other" based the input image data. In the lighting certainty calculation processing described above, a density correction quantity regarding a lighting type for which the certainty was "0" need not necessarily be obtained.

Density correction quantities Tbl, Tst, Ttg, Tot of respective ones of the lighting types "backlight", "proximity strobe", "tungsten" and "other" are calculated according to the following equations:

$$Tbl = a_1 X_1 + a_2 X_2 + a_3 X_3 +$$

$$Tst = b_1 Y_1 + b_2 Y_2 + b_3 Y_3 +$$

$$Ttg = c_1 Z_1 + c_2 Z_2 + c_3 Z_3 +$$

$$Tot = d_1 A_1 + d_2 A_2 + d_3 A_3 + \qquad \text{Equation 7}$$

Equations 7 are all regression formulae based upon multiple regression analysis. Here $X_m$, $Y_m$, $Z_m$, $A_m$ (m=1, 2, 3, ...) are features regarding the lighting types "backlight", "proximity strobe", "tungsten" and "other", respectively, and $a_n$, $b_n$, $c_n$, $d_n$ (n=1, 2, 3, ...) represent partial regression coefficients.

The calculation formula ($Tbl = a_1 X_1 + a_2 X_2 + a_3 X_3 + ...$) for the density correction quantity regarding the lighting type "backlight" will be described as representative of the lighting types "backlight", "proximity strobe", "tungsten" and "other".

First, a number of items of image data for which the lighting type is "backlight" are prepared and feature values indicative of "backlight", e.g., average density value at the central portion of the image, average density value at the peripheral portion of the image and the difference between the average density value of the central portion of the image and the average density value at the peripheral portion of the image, are obtained. Further, a density correction quantity serving as a target value is set in advance. As the type of this quantity, use can be made of the same type as that stored in the lighting certainty calculation memory 24 used in certainty calculation processing regarding lighting type.

Multiple regression analysis is performed with the partial regression coefficients $a_1$, $b_1$, $c_1$, $d_1$ serving as unknowns, and the partial regression coefficients $a_1$, $b_1$, $c_1$, $d_1$ are decided. The partial regression coefficients $a_1$, $b_1$, $c_1$, $d_1$ decided are stored in partial regression coefficient memory 25.

By using the partial regression coefficients $a_1$, $b_1$, $c_1$, $d_1$ thus stored in partial regression coefficient memory 25 and the features $X_1$, $X_2$, $X_3$, $X_4$ ... obtained from the input image data, the density correction quantity Tbl for the lighting type "backlight" regarding the input image data is decided in accordance with Equations 7 (function block 17a).

It goes without saying that partial regression coefficients $b_n$, $c_n$, $d_n$ (n=1, 2, 3, ...) are stored in the partial regression coefficient memory 25 in a similar manner with regard to the other lighting types "proximity strobe", "tungsten" and "other". By using the partial regression coefficients stored in the partial regression coefficient memory 25, the density correction quantities Tst, Ttg, Tot regarding "proximity strobe", "tungsten" and "other" are each calculated in the density correction quantity calculating circuit 17 based upon Equations 7 (function blocks 17b to 17d).

The density correction quantities Tbl, Tst, Ttg, Tot of respective ones of the lighting types "backlight", "proximity strobe", "tungsten" and "other" calculated in the density correction quantity calculating circuit 17 and the lighting certainties (assumed to be Qbl, Qst, Qtg, Qot) of respective ones of the lighting types "backlight", "proximity strobe", "tungsten" and "other" calculated in the lighting-certainty calculating circuit 16 are applied to the density correction value calculating circuit 18 for the subject type "outside scope of detection".

The density correction value Tot(s) of the subject type "outside scope of detection" is calculated according to Equation 8 below in the density correction value calculating circuit 18 for the subject type "outside scope of detection" (function block 18a).

$$Tot(s) = s + WblTbl + WstTst + WtgTtg + WotTot \qquad \text{Equation 8}$$

In Equation 8 above, variable s is an input density value, and Wbl, Wst, Wtg, Wot are weights that are based upon certainties of lighting types "backlight", "proximity strobe", "tungsten" and "other", respectively. Further, Tbl, Tss, Ttg, Tot represent density correction quantities of the lighting types "backlight", "proximity strobe", "tungsten" and "other", respectively.

The weights Wbl, Wst, Wtg, Wot of the lighting types "backlight", "proximity strobe", "tungsten" and "other", respectively, in Equation 8 are calculated according to the following equation:

$$Wr = Qr / \Sigma(Qr) \qquad \text{Equation 9}$$

In Equation 9, variable r represents that this is in regard to each of the lighting types "backlight", "proximity strobe", "tungsten" and "other".

The density correction value Tot regarding the subject type "outside scope of detection" found according to Equation 8 is used in Equation 1 of the first embodiment. The unified density correction value T(s) in which the lighting certainty is reflected is calculated.

The density of the input image data is corrected in the image correcting circuit 15 using the calculated unified density correction value T(s). In this point this embodiment is the same as the first embodiment.

In the second embodiment, as described above, in a case where the subject type "outside scope of detection" exists in the input image, an "outside scope of detection" density correction value conforming to the certainty (weight based upon certainty) of the lighting type is calculated and the calculated density correction value is reflected in the unified density correction value. A density correction conforming to the lighting type is implemented.

In the second embodiment also, in a manner similar to Modification 1 of the first embodiment, it may be so arranged that a lighting type for which the lighting certainty is to be decided is designated (limited). Since certainty and density correction quantity are calculated solely with regard to the designated lighting type, processing time in the lighting-certainty calculating circuit 16 can be shortened. For example, images captured using a mobile telephone do not include images under the lighting conditions of a proximity strobe because a mobile telephone is not equipped with a strobe. In such case the lighting types "backlight", "tungsten" and "other" are designated. Certainty and a density correction quantity regarding "proximity strobe" are not calculated.

In a manner similar to that of Modification 2 of the first embodiment, it may be arranged to accept a lighting type-by-type certainty input from the operator. In this case, the lighting type-by-type certainty that has been entered by the operator is output from the certainty calculating circuit 16 for lighting type as is. Certainty calculation processing in the certainty calculating circuit 16 for lighting type is not executed.

Furthermore, in a manner similar to Modification 3 of the first embodiment, it may be so arranged that the lighting type-by-type certainties that have been calculated by the certainty calculating circuit 16 for lighting type are displayed on a display screen together with an image to be processed and revision of the lighting type-by-type certainties by the operator is accepted. The lighting type-by-type certainties revised by the operator are output from the certainty calculating circuit 16 for lighting type.

In the first and second embodiments described above, density correction values (density grayscale correction values) are calculated for each of subject types, and a unified density correction value is calculated in accordance with the calculated subject type-by-type certainties (weights based upon certainties) and entered degrees of importance. However, instead of density correction values, or in addition to density correction values, CMY density correction values in which the white balance of the C, M, Y densities has been changed, saturation grayscale correction values in which output saturation has been made to conform to input saturation, and other grayscale correction values may be calculated, and a unified CMY density correction value and unified saturation grayscale correction value, etc., may be calculated. In this case, the input image data is corrected using the unified CMY density correction value and unified saturation grayscale correction value.

The image processing apparatus 1, 1A can be implemented by hardware circuits, as mentioned above, or part or the entirety thereof can be implemented by software (a program).

What is claimed is:

1. An image processing apparatus comprising:
subject type-by-type certainty calculating means for calculating certainties representing to what degrees of confidence respective ones of images representing a predetermined plurality of subject types are contained in an image represented by applied image data, the calculation being performed for every prescribed subject type based upon a feature value obtained from the image data;
subject type-by-type correction value calculating means for calculating correction values regarding respective ones of the plurality of subject types based upon the image data;
correction-value unifying means for calculating a unified correction value obtained by weighting each of the correction values, which have been calculated by said subject type-by-type correction value calculating means, with regard to corresponding subject types by weights conforming to the subject type-by-type certainties calculated with regard to respective ones of the plurality of subject types by said subject type-by-type certainty calculating means, and unifying the subject type-by-type values obtained by weighting;
image data correction means for correcting the image data using the unified correction value calculated by said correction-value unifying means; and
further comprising subject-type designating means;
wherein said subject type-by-type certainty calculating means calculates the subject type-by-type certainty with regard to a subject type designated by said subject-type designating means or a subject type other than a subject type designated by said subject-type designating means; and
said subject type-by-type correction value calculating means calculates the subject type-by-type correction value with regard to a subject type designated by said subject-type designating means or a subject type other than a subject type designated by said subject-type designating means.

2. An image processing apparatus according to claim 1, wherein with regard to a subject type for which the certainty calculated by said subject type-by-type certainty calculating means is less than a prescribed value, said subject type-by-type certainty calculating means forgoes calculating a correction value with respect to this subject type.

3. An image processing apparatus according to claim 1, wherein said correction-value unifying means calculates the unified correction value by multiplying together, with regard to respective ones of the plurality of subject types, degrees of importance applied or set in advance, the subject type-by-type certainties calculated by said subject type-by-type certainty calculating means with regard to corresponding subject types and the correction values calculated by said subject-type-by-type correction value calculating means with regard to corresponding subject types, and unifying the subject type-by-type values obtained by multiplication.

4. The image processing apparatus of claim 1, wherein the subject type-by-type certainty calculating means and the subject type-by-type correction value calculating means only calculates the certainty and correction value solely with respect to the designated subject type or alternatively calculates the certainty and correction value solely with respect to a subject other than the designated subject type.

5. An image processing apparatus comprising:
subject type-by-type certainty calculating means for calculating certainties representing to what degrees of confidence respective ones of images representing a predetermined plurality of subject types are contained in an image represented by applied image data, the calculation being performed for every prescribed subject type based upon a feature value obtained from the image data;
subject type-by-type correction value calculating means for calculating correction values regarding respective ones of the plurality of subject types based upon the image data;
correction-value unifying means for calculating a unified correction value obtained by weighting each of the correction values, which have been calculated by said subject type-by-type correction value calculating means, with regard to corresponding subject types by weights conforming to the subject type-by-type certainties calculated with regard to respective ones of the plurality of subject types by said subject type-by-type certainty calculating means, and unifying the subject type-by-type values obtained by weighting; and
image data correction means for correcting the image data using the unified correction value calculated by said correction-value unifying means, further comprising:
lighting type-by-type certainty calculating means for calculating lighting certainties representing to what degrees of confidence the image represented by the image data was shot under respective ones of a predetermined plurality of lighting types, the calculation being performed for every prescribed lighting type based upon a feature value obtained from the image data;

lighting type-by-type correction quantity calculating means for calculating correction quantities regarding respective ones of the prescribed plurality of lighting types based upon the image data; and correction quantity calculating means for weighting each of the correction quantities, which have been calculated by said lighting type-by-type correction quantity calculating means, with regard to corresponding lighting types by weights conforming to the lighting type-by-type lighting certainties calculated by said lighting type-by-type certainty calculating means, and calculating a correction quantity by summing the lighting type-by-type values obtained by weighting;

wherein the predetermined plurality of subject types include a plurality of subject types that are detectable and a subject type that is outside the scope of detection; and said correction-value unifying means uses a value, which is obtained by adding the correction quantity calculated by said correction quantity calculating means to an input value to be corrected, as a correction value of a subject type that is outside the scope of detection.

6. An image processing apparatus according to claim 5, further comprising lighting-type designating means;

wherein said lighting type-by-type certainty calculating means calculates the lighting type-by-type certainty with regard to a lighting type designated by said lighting-type designating means or a lighting type other than a lighting type designated by said subject-type designating means; and said lighting type-by-type correction value calculating means calculates the lighting type-by-type correction value with regard to a lighting type designated by said lighting-type designating means or a lighting type other than a lighting type designated by said lighting-type designating means.

7. An image processing method comprising:

calculating certainties representing to what degrees of confidence respective ones of images representing a predetermined plurality of subject types are contained in an image represented by applied image data, the calculation being performed for every prescribed subject type based upon a feature value obtained from the accepted image data;

calculating correction values regarding respective ones of the plurality of subject types based upon the image data;

calculating a unified correction value obtained by weighting each of the correction values, which have been calculated with regard to corresponding subject types by weights conforming to the subject type-by-type certainties calculated with regard to respective ones of the plurality of subject types, and unifying the subject type-by-type values obtained by weighting;

correcting the image data using the unified correction value calculated; and further comprising designating a subject type;

wherein said the subject type-by-type certainty is calculated with regard to a subject type designated by said subject-type designating step or a subject type other than a subject type designated by said subject-type designating subject type; and said correction value regarding respective ones of the plurality of subject types comprises calculating the subject type-by-type correction value with regard to a subject type designated by said subject-type designating step or a subject type other than a subject type designated by said subject-type designating step.

8. A non-transitory computer readable medium storing a program for causing a computer to execute the following processing:

subject type-by-type certainty calculation processing for calculating certainties representing to what degrees of confidence respective ones of images representing a predetermined plurality of subject types are contained in an image represented by applied image data, the calculation being performed for every prescribed subject type based upon a feature value obtained from the accepted image data;

subject type-by-type correction value calculation processing for calculating correction values regarding respective ones of the plurality of subject types based upon the image data;

correction-value unification processing for calculating a unified correction value obtained by weighting each of the correction values, which have been calculated by said subject type-by-type correction value calculation processing, with regard to corresponding subject types by weights conforming to the subject type-by-type certainties calculated with regard to respective ones of the plurality of subject types by said subject type-by-type certainty calculation processing, and unifying the subject type-by-type values obtained by weighting;

image data correction processing for correcting the image data using the unified correction value calculated by said correction-value unification processing; and further comprising designating a subject-type;

wherein said subject type-by-type certainty calculation comprises calculating the subject type-by-type certainty with regard to a subject type designated by said subject-type designating step or a subject type other than a subject type designated by said subject-type designating step; and said subject type-by-type correction value calculating comprises calculating the subject type-by-type correction value with regard to a subject type designated by said subject-type designating step or a subject type other than a subject type designated by said subject-type designating step.

* * * * *